United States Patent
Keren et al.

(10) Patent No.: US 8,670,552 B2
(45) Date of Patent: *Mar. 11, 2014

(54) SYSTEM AND METHOD FOR INTEGRATED DISPLAY OF MULTIPLE TYPES OF CALL AGENT DATA

(75) Inventors: Shimon Keren, Sunnyvale, CA (US); Jeff Iannone, Alpharetta, GA (US); James Gordon Nies, Carmel, IN (US); Srivijaya Srinivasa, Suwanee, GA (US)

(73) Assignee: Verint Systems, Inc., Santa Clara, CA (US)

( * ) Notice: Subject to any disclaimer, the term of this patent is extended or adjusted under 35 U.S.C. 154(b) by 1985 days.

This patent is subject to a terminal disclaimer.

(21) Appl. No.: 11/359,195

(22) Filed: Feb. 22, 2006

(65) Prior Publication Data

US 2007/0206764 A1 Sep. 6, 2007

(51) Int. Cl.
*H04M 3/00* (2006.01)

(52) U.S. Cl.
USPC ............ 379/265.06; 379/32.01; 379/100.05; 379/133; 379/265.03; 715/763; 715/764

(58) Field of Classification Search
USPC ............ 379/265.01–265.06, 32.01, 100.05, 379/133–136, 140; 709/224; 715/763–765
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A * | 4/1985 | Costello et al. | 379/265.01 |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,185,780 A * | 2/1993 | Leggett | 379/265.08 |
| 5,210,789 A | 5/1993 | Jeffus et al. | |
| 5,239,460 A | 8/1993 | LaRoche | |

(Continued)

FOREIGN PATENT DOCUMENTS

EP 0453128 A2 10/1991
EP 0773687 A2 5/1997

(Continued)

OTHER PUBLICATIONS

IEX Corporation (TotalView WebStation, Release 3.7, Document No. 1-602-660, Jun. 2004).*

(Continued)

*Primary Examiner* — Oleg Asanbayev
(74) *Attorney, Agent, or Firm* — Meunier Carlin & Curfman

(57) ABSTRACT

Method and systems are presented for presenting multiple activities associated with one of a plurality of call center agents correlated in time. In one embodiment, the method comprises the steps of: determining at least one of the agents to be displayed; and displaying activity information in visual correlation with a timeline. The activity information includes a first plurality of activities originating from a first source and a second plurality of activities originating from a second source. Each of the activities is associated with the at least one agent.

7 Claims, 20 Drawing Sheets

(56) References Cited

U.S. PATENT DOCUMENTS

| | | | |
|---|---|---|---|
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,511,117 A * | 4/1996 | Zazzera | 379/265.03 |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,754,646 A | 5/1998 | Williams et al. | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,911,134 A | 6/1999 | Castonguay et al. | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,971 A | 11/2000 | Sunderman et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 * | 4/2002 | House et al. | 709/224 |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,438,550 B1 | 8/2002 | Doyle et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,523,119 B2 | 2/2003 | Pavlin et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,683,947 B2 | 1/2004 | Roelle et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,054 B1 | 11/2004 | Suhm et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 7,274,375 B1 | 9/2007 | David | |
| 7,711,104 B1 | 5/2010 | Flockhart et al. | |
| 7,953,219 B2 * | 5/2011 | Freedman et al. | 379/265.06 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154072 A1 | 8/2003 | Young et al. | |

(56) References Cited

U.S. PATENT DOCUMENTS

| | | | |
|---|---|---|---|
| 2003/0154240 | A1 | 8/2003 | Nygren et al. |
| 2004/0100507 | A1 | 5/2004 | Hayner et al. |
| 2004/0103409 | A1 | 5/2004 | Hayner et al. |
| 2004/0117185 | A1 | 6/2004 | Scarano et al. |
| 2004/0165717 | A1 | 8/2004 | McIlwaine et al. |
| 2004/0249650 | A1 | 12/2004 | Freedman et al. |
| 2005/0075097 | A1* | 4/2005 | Lehikoinen et al. ....... 455/414.1 |
| 2005/0135609 | A1 | 6/2005 | Lee et al. |
| 2005/0163305 | A1 | 7/2005 | Jerijian et al. |
| 2005/0216838 | A1 | 9/2005 | Graham |
| 2006/0109975 | A1* | 5/2006 | Judkins et al. ........... 379/265.02 |
| 2006/0271526 | A1* | 11/2006 | Charnock et al. ................. 707/3 |
| 2007/0127695 | A1* | 6/2007 | Noyan et al. ............. 379/265.09 |

FOREIGN PATENT DOCUMENTS

| | | |
|---|---|---|
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

Official Office Action, dated Mar. 21, 2011, received in connection with U.S. Appl. No. 11/359,357.
Official U.S. Official Action, dated Jun. 20, 2013, issued in related U.S. Appl. No. 12/879,868.
"Customer Spotlight: Navistar International," Web pae, unverified print date of Apr. 1, 2002.
"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date, Submitted on Sep. 14, 2010.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source, Submitted on Sep. 14, 2010.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).

(56) References Cited

OTHER PUBLICATIONS

McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,*" *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business", Submitted on Sep. 14, 2010.
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommunications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cyptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. *Déjà vu—Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News, Submitted on Sep. 14, 2010.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News, Submitted on Sep. 14, 2010.
*Interactive TV Wars Heat Up*, Industry Standard, Submitted on Sep. 14, 2010.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com, Submitted on Sep. 14, 2010.
Moody. *WebTV: What the Big Deal?*, ABCNews.com, Submitted on Sep. 14, 2010.
Murdorf, et al. *Interactive Television—Is There Life After the Internet?*, Interactive TV News, Submitted on Sep. 14, 2010.
Needle. *PC, TV or Both?*, PC World Online, Submitted on Sep. 14, 2010.
*Interview with Steve Perlman*, CEO of Web-TV Networks, PC World Online, Submitted on Sep. 14, 2010.
Press. *Two Cultures, The Internet and Interactive TV*, Universite de Montreal, Submitted on Sep. 14, 2010.
Reuters. *Will TV Take Over Your PC?*, PC World Online, Submitted on Sep. 14, 2010.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online, Submitted on Sep. 14, 2010.
Stewart. *Interactive Television at Home: Television Meets the Internet*, Aug. 1998.
Swedlow. *Computer TV Shows: Ready for Prime Time?*, PC World Online, Submitted on Sep. 14, 2010.
Wilson. *U.S. West Revisits Interactive TV*, Interactive Week, Nov. 28, 1999.

\* cited by examiner

SYSTEM AND METHOD FOR INTEGRATED DISPLAY OF MULTIPLE TYPES OF CALL AGENT DATA

FIELD OF THE DISCLOSURE

The present disclosure relates to call centers.

BACKGROUND

The business of a call center is to provide rapid and efficient interaction between agents and customers, or prospective customers. Conventional call center systems determine if agents are being productive and meeting call center targets (called "adherence") by tracking phone usage of agents. In addition to talking to a customer on the phone, such an agent usually spends time using a PC or workstation application, such as a customer relationship manager (CRM) or a customer account database. The proficiency of an agent on these applications therefore impacts overall call center productivity. However, conventional call center systems do not utilize information about application usage when providing adherence information.

Today's call centers often support various interaction methods and media, including phone, e-mail and messaging applications. Call center systems typically allow some or all of these interactions to be recorded. The recordings may be reviewed later for compliance with business or government regulations, or for quality assurance. These systems also allow a supervisor to monitor interactions, typically to determine if an agent is adhering to call center policies.

In conventional call center systems, the playback of recorded interactions and live monitoring of interactions occurs in an "interactions" application, sometimes known as a "contacts" application. A separate "schedule adherence" application is used to compare agents' scheduled activities with agents' actual activities and to provide information about adherence exceptions to the scheduled activities.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

SUMMARY OF THE INVENTION

Method and systems are presented for presenting multiple activities associated with one of a plurality of call center agents correlated in time. In one embodiment, the method comprises the steps of: determining at least one of the agents to be displayed; and displaying activity information in visual correlation with a timeline. The activity information includes a first plurality of activities originating from a first source and a second plurality of activities originating from a second source. Each of the activities is associated with the at least one agent.

DETAILED DESCRIPTION

Figure 1:
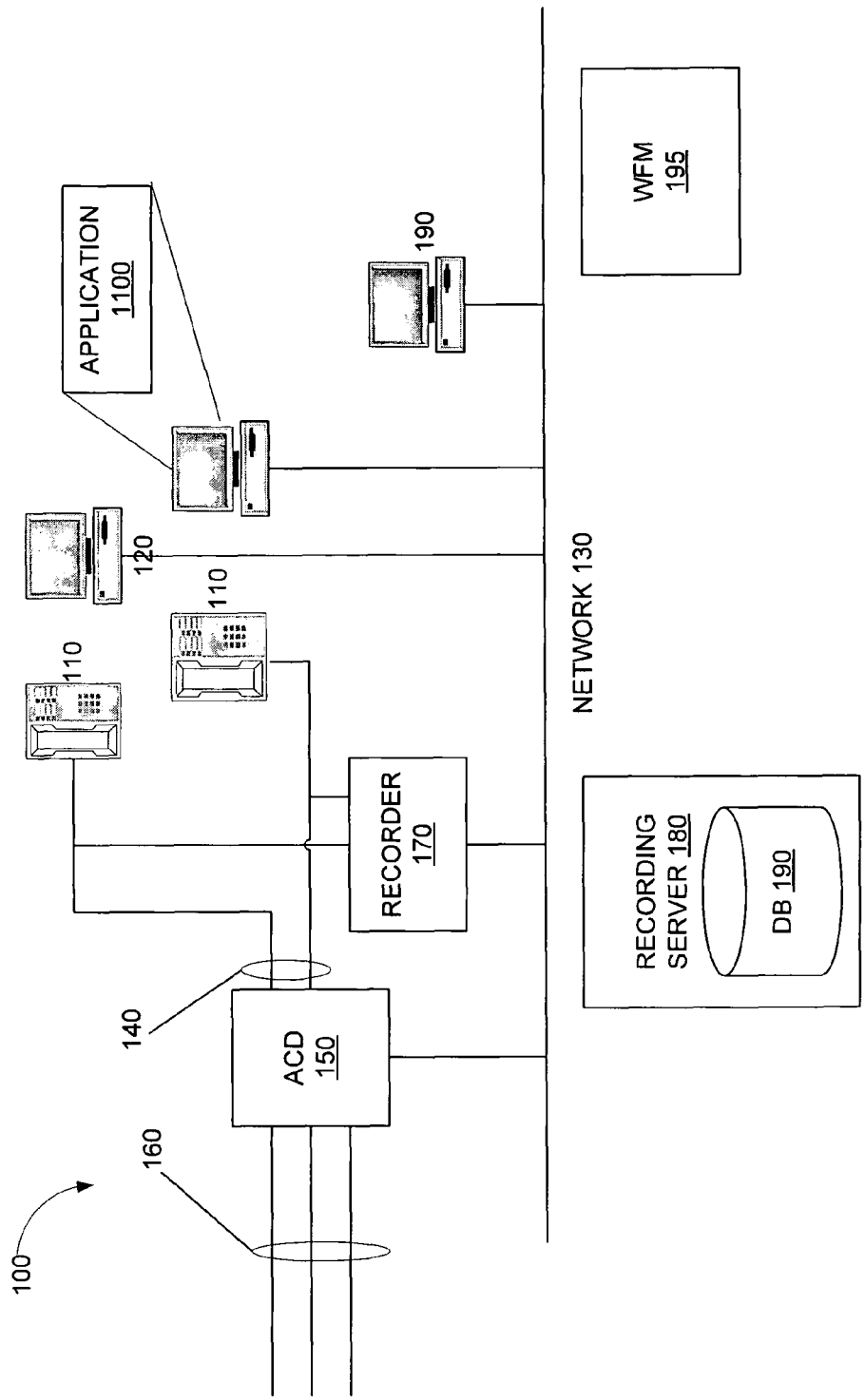
FIG. 1 is a block diagram of a call center environment.

FIG. 1 is a block diagram of a call center environment 100. The call center 100 is staffed by agents who handle incoming and/or outgoing phone calls. An agent workspace ("position") includes an agent phone 110 ("station") and a workstation computer 120. A network 130 connects one or more of the agent workstations 120 to other call system components. Each agent phone 110 is connected by a trunk line 140 to an automatic call distributor (ACD) 150. Although shown as separate devices, the phone 110 may be integrated into the workstation 120. In this case (called a "soft phone"), the agent controls telephony functions through the workstation 120.

When an agent is ready to receive calls at his phone, the agent first logs into the ACD 150. This login notifies the ACD 150 that the agent is available to take calls. An agent's ACD state changes throughout the workday, as the agent takes calls, performs after-call work, takes breaks, etc. An example list of ACD states includes available, busy, after-call work, unavailable.

The ACD 150 distributes incoming phone calls to available agents. A phone call comes into the call center 100 on an outside trunk 160. If an agent is not available, the ACD 150 puts the call into a queue, which effectively places the caller on hold. When an agent is available, the ACD 150 connects the outside trunk line 160 carrying the phone call to one of the agents. More specifically, the ACD 150 connects the outside trunk line 160 to the trunk line 140 of the selected agent.

A call recorder 170, connected to one or more of the agent trunk lines 140, provides call recording capabilities. In a typical call center such as that shown in FIG. 1, the recorder 170 is a server with specialized hardware (e.g., digital signal processing boards). The recorder 170 receives instructions from a recording server 180. The recording server 180 maintains an interactions database 190 which stores the recorded content as well as descriptive information about the recording. The recording server 180 provides an interface for searching the interactions database 190.

While on a call with a customer, the agent interacts with one or more applications 1100 running on the workstation 120. Examples are applications that give the agent access to customer records, product information, ordering status, transaction history, etc. The applications may access one or more enterprise databases (not shown) via the network 130.

The call center 100 also includes a work force manager (WFM) 195, which is typically divided among several applications. The WFM 195 comprises the suite of applications. Many of the WFM components have a user interface which runs on a supervisor workstation 1120.

The WFM 195 performs many functions. One such function is calculating staffing levels and agent schedules, based on historical patterns of incoming calls. Another function of the WFM 195 is collecting call center contact statistics and providing this information, both historical and real-time, to the call center supervisor or manager. Yet another function of the WFM 195 is supplying the supervisor with information on how well each agent complies with call center policies. The portion of the WFM 195 that performs this last function is the adherence subsystem.

In general terms, the function of an adherence subsystem is to determine whether agent activities comply with ("adhere to") call center policies. An instance where an agent activity does not adhere to a policy is an "exception." An adherence subsystem may support different levels of adherence, where policies are defined, and agent activities are captured, with different amounts of detail.

For example, the policy used in a low-level form of adherence might be a schedule: e.g., agent is expected to be working the phone from 10 AM to 11 AM and e-mail from 11 AM to 12 PM. Information about calls or emails handled by an agent is not relevant to this first form of adherence. In contrast, in a higher-level form of adherence, policy includes quality targets: e.g., an agent is expected to have a call duration of less than 5 minutes.

Figure 2:
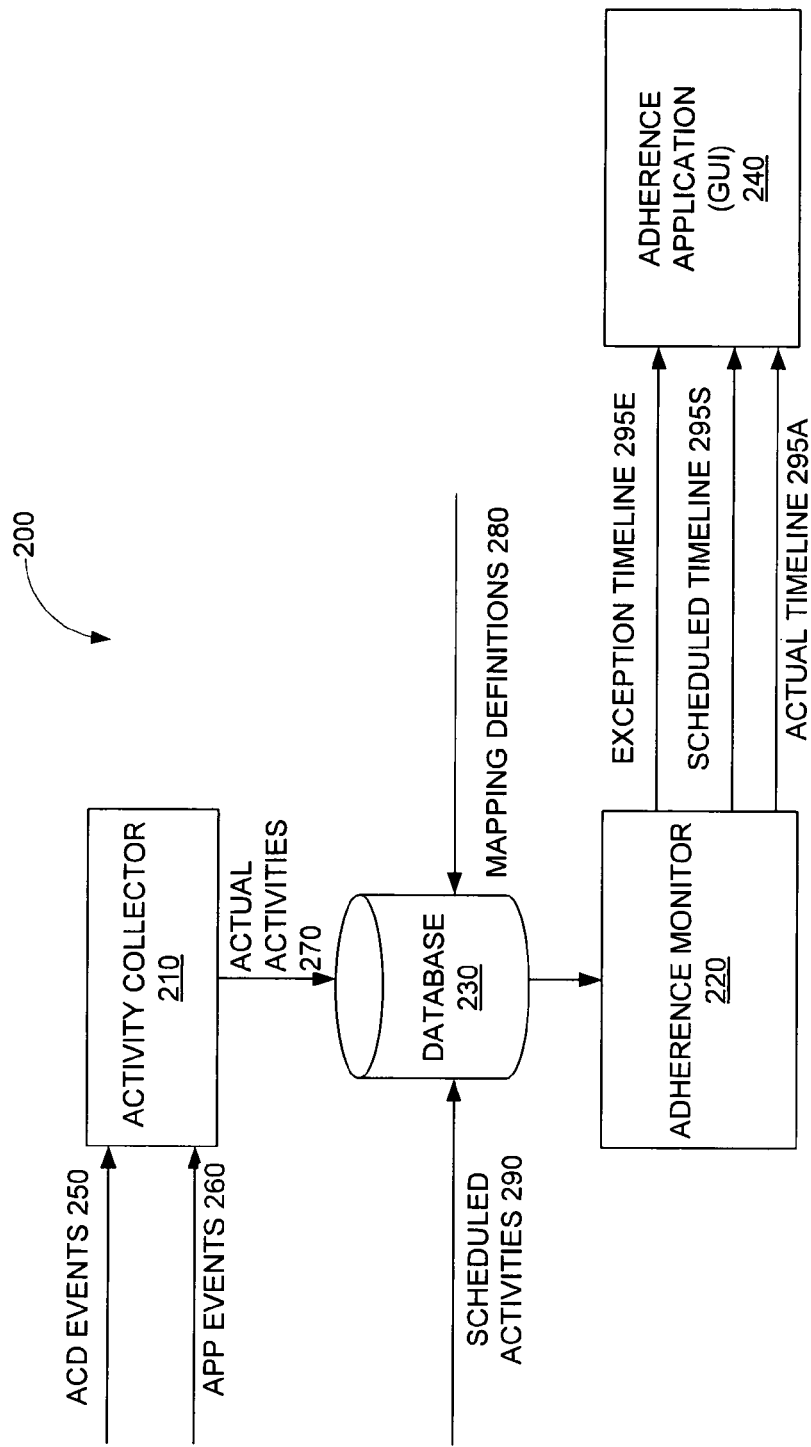
FIG. 2 is a block diagram showing one example of an adherence subsystem in the WFM of FIG. 1.

FIG. 2 is a block diagram showing one embodiment of an adherence subsystem 200 in the WFM 195. In adherence subsystem 200, policies are defined in terms of scheduled activities, where these scheduled activities correspond to tasks performed by agents during a workday. Adherence is then determined by comparing the activities actually performed by agents with the activities scheduled to be performed by the agents. The adherence subsystem 200 in FIG. 2 includes an activity collector 210, an adherence monitor component 220, an adherence database 230, and an adherence application 240 (including a user interface).

As the agent takes calls throughout the day, the agent's ACD state changes. The ACD 150 reports these state changes to the activity collector 210 as ACD events 250. (In some environments, the events may be Computer Telephony Integration (CTI) events instead of ACD events). As an agent interacts with various applications 1100 on his workstation 120, application events 260 are reported to the activity collector 210. Events are then mapped into agent activities 270, using activity mapping definitions 280 provided by a user.

Example mappings might be:
ACD_Avail|ACD_Busy|ACD_AfterCallWork|ACD_Hold=Activity_Phone
ACD_LoggedOut=Activity_Break
PC_Outlook=Activity_Email
PC_InstantMessenger=Activity_Chat
PC_FaxApp=Activity_Fax These collected agent activities 270 are "actual" activities which have actually occurred. In contrast, a scheduled activity is scheduled to occur, and may or may not have actually occurred. A manager or supervisor defines scheduled activities (290) through a WFM application (not shown). As explained above, scheduled activities 290 correspond to tasks performed by agents during a workday (e.g., Phone, E-mail, Chat, Fax, Out).

Both types of activities (270, 290) are stored in the adherence database 230. In one implementation, the activity information stored in adherence database 230 includes an agent identifier; an activity code; a start time; and a duration. In another implementation, the activity information stored in adherence database 230 includes: an agent identifier; an activity code; a start time; and a stop time.

The adherence monitor 220 retrieves actual activities 270 and scheduled activities 290 and compares them on a per-agent basis. If the comparison reveals a discrepancy between an actual activity 270 and a scheduled activity 290 for the same agent, the adherence monitor 220 notes this as a exception. However, the comparison may take into account a guard time for a scheduled activity 290. For example, a policy could be defined to allow an agent to log into the ACD two minutes early, or one minute late, without reporting the activity as out of adherence.

The adherence monitor 220 provides information about the scheduled activities 290, the actual activities 270, and the exceptions to the adherence application 240. In this implementation, that information is provided in the form of three timelines: a scheduled timeline 295S, an actual timeline 295A, and an adherence exception timeline 295E. The adherence application 240 displays the timelines for viewing by a call center supervisor, typically in a graphical view.

The adherence subsystem 200 described above represents only one example of how functionality can be partitioned between components in an adherence subsystem. One of ordinary skill in the art should understand that other partitions are possible. As just one example, another variation of the adherence database 230 stores device events rather than actual activities in the adherence database 230, and the mapping from events to actual activities is performed by the adherence monitor 220 rather than the activity collector 210. Furthermore, one of ordinary skill in the art should recognize that the "timeline" produced by the adherence monitor 220 is not required to be a graphical representation, but can be any data structure which conveys the underlying information about activities and occurrence times. In another variation, the adherence exception timeline 295E is not stored in the database but calculated on the fly.

In this disclosure, the term "interaction" refers to a record of the content of agent activities related to a call. Note that agent activities are not limited to audio of the call itself. Other forms of media are included, such as video of the agent, the application activity on the agent's workstations 120, and messages delivered through e-mail, instant messaging, or other messaging technologies. Also, the agent activities in an interaction are not limited to the duration of the call, but can occur after the call (called "wrap up" or "research").

Conventional call center systems provide an "interactions" application that allows playback of recorded interactions and live monitoring of interactions. Importantly, these conventional systems did not integrate interactions with adherence or exceptions to adherence.

Figure 3:
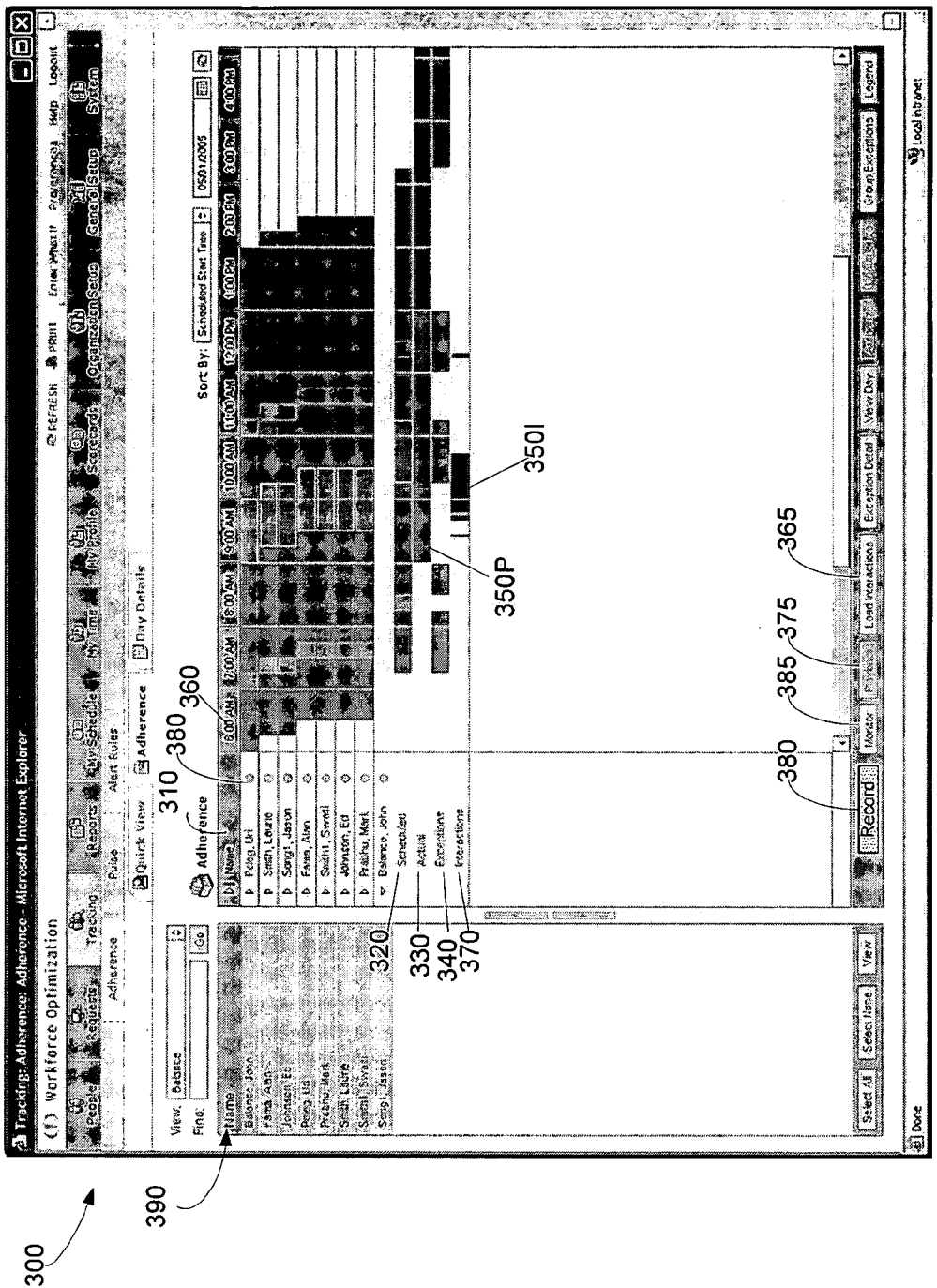
FIG. 3 shows a user interface for an adherence application that displays exceptions to agent adherence together with information about interactions.

FIG. 3 shows a user interface for an adherence application 240 that displays exceptions to agent adherence together with information about interactions. An adherence window 300 presents a timeline view of exceptions to adherence for a list of agents (310) during a specified time period. For each agent, one line (320) shows the agent's schedule, another line (330) shows the agent's actual activity, and another line (340) shows activities that are adherence exceptions.

Blocks 350 indicate periods of agent activity (actual or scheduled), occurring at specific times and for specific durations. The location of an activity block 350 is aligned with the timeline axis 360 to show this time and duration. Each activity on these three lines is aligned appropriately with a timeline axis 360 (e.g., an activity starting at 5:00 PM and ending at 5:30 PM would have its left edge aligned with the 5:00 PM marker on the timeline axis 360).

Each different type of activity (e.g., Phone, LoggedOut) is displayed with a different visual attribute (e.g., color, pattern, shading). The combination of timeline alignment and color-coded activities allows a user to quickly get an overall picture of what an agent is spending his time on in a given time period. In one implementation, one color/pattern/shade is used for activities that have one recorded interaction and another is used for activities that have multiple recorded interactions. A legend may be included to show which color/pattern/shade corresponds to each of these types.

In this view, another line (370) presents a list of agent interactions during that time period. Interactions differ from activities. On the actual activities line 320, an activity block merely describes which activity occurred, and its time period. For example, activity block 350P tells the viewer that an agent was in the Phone activity from 9:00 to 12:00. Interaction block 350I during that time period tells the user that recorded content is available for calls between 9:45 and 10:45. By presenting exceptions to agent adherence together with, and visually aligned with, information about interactions, a user can quickly discover which exceptions can be further examined by reviewing, or playing back, the corresponding interaction information.

Figure 4:
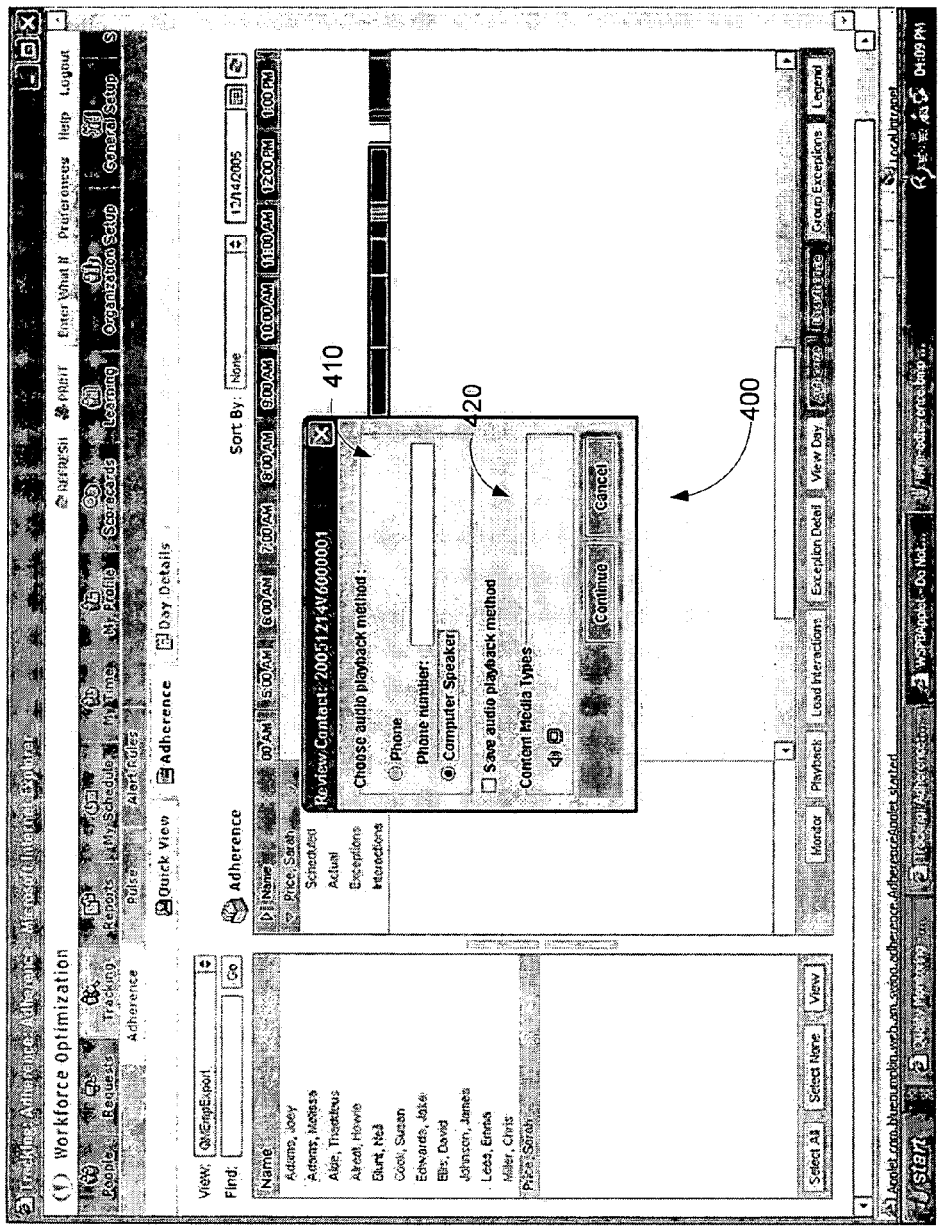
FIG. 4 shows a media options dialog box.

The list of interactions can be refreshed by activating a Load Interactions button 365. A user can play back an interaction, record an agent on-demand, or monitor an agent in real-time by activating various buttons (375, 380, 385). A user plays back a particular interaction block (e.g., 350I), by selecting the interaction block, and then activating the playback button 375. When the playback button 375 is activated, the media options dialog box 400, shown in FIG. 4, is displayed.

The media options dialog box 400 presents the user with choices for an audio playback device (410). The media type (420) of the recording is displayed (e.g., call audio, agent video, and agent workstation activity).

Figure 5:
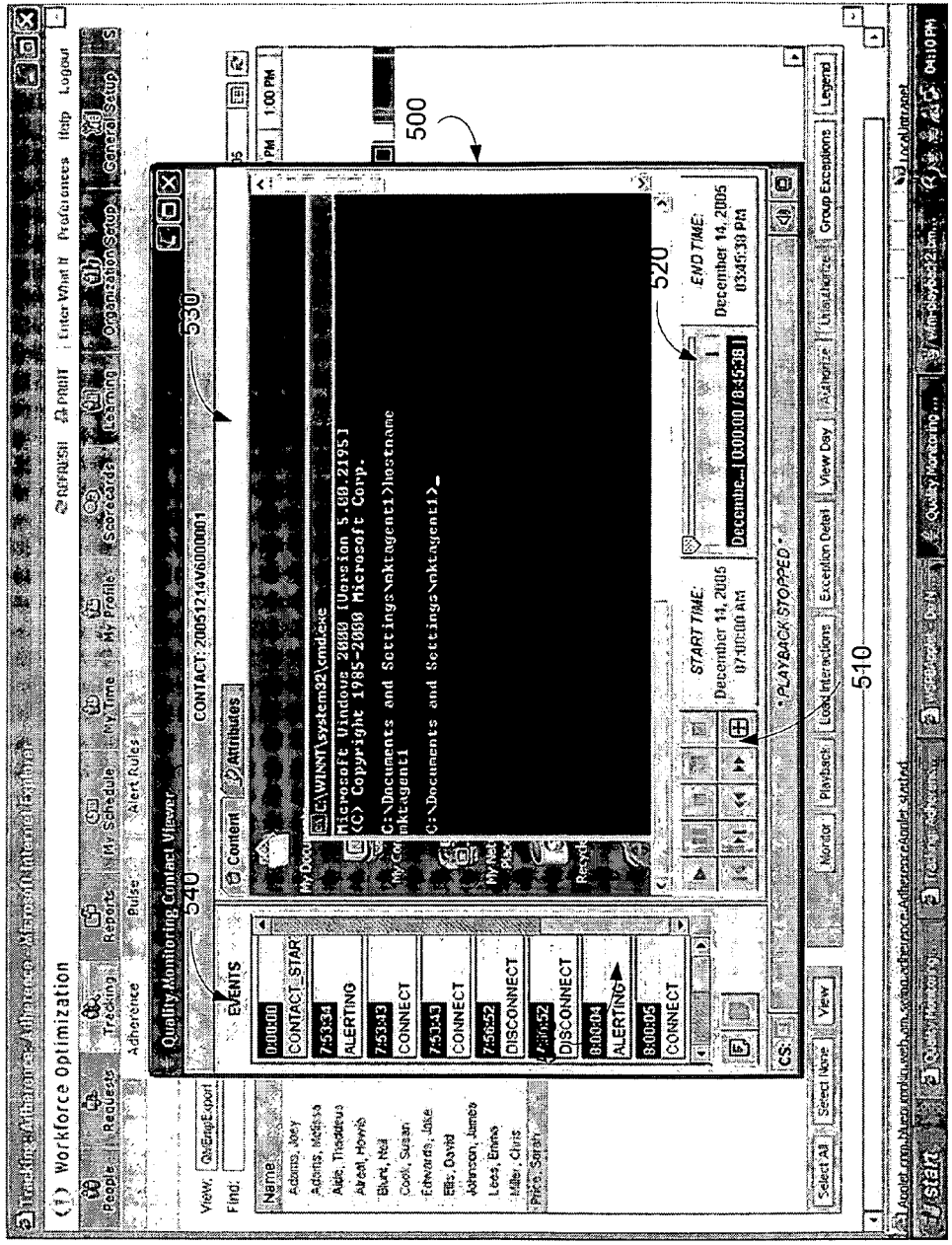
FIG. 5 shows a playback window which is displayed after a user has made choices in the media options dialog box of FIG. 4.

FIG. 5 shows a playback window 500 which is displayed after a user has made choices in the media options dialog box 400. A playback control 510 contains buttons (e.g., fast-forward, rewind) which allow a user to move to different portions of the interaction, and to pause and resume playback. A progress indicator 520 shows the current position relative to the entire interaction.

If the media type included workstation activity, then a portion (530) of the playback window 500 is used to "play back" what appeared on the agent's workstation screen during the interaction. If the media type included audio, then the audio is played on the chosen audio device (e.g., workstation speaker, phone). In one implementation, a list of events that occurred during the interaction, and the time of each, is displayed in an event list 540.

The user interface described in FIGS. 3-5 allows a supervisor to review interactions that were recorded in the past. Interactions are typically recorded according to a predefined configuration created through the recording server 180. The adherence window 300 disclosed herein also allows a supervisor to start an immediate (on-demand) recording of a particular agent, or to monitor an agent in real time.

Each agent in the list 310 has a record-on-demand button 380 if recording is available for that agent. To record a specific agent on demand, the user activates the record-on-demand button 380 associated with this specific agent. A visual indication that the agent is being recorded is then displayed (e.g., the record-on-demand button 380 changes color, the agent's name flashes, the agent's name is displayed in a different color). To stop the recording, the user activates the record-on-demand button 380 a second time.

The live monitor feature works as follows. The user selects an agent from the agent list 310 and activates the live monitor button 385. Then the user selects an audio playback device as well as content type from media options dialog box 400 (FIG. 4). If the content type includes audio, then audio of the selected agent begins playback on the selected device. If the content type includes workstation activity, another window appears in activity on the agent's workstation screen is displayed. In one implementation, this workstation activity window is similar to the window 530 in FIG. 5.

Figure 6:
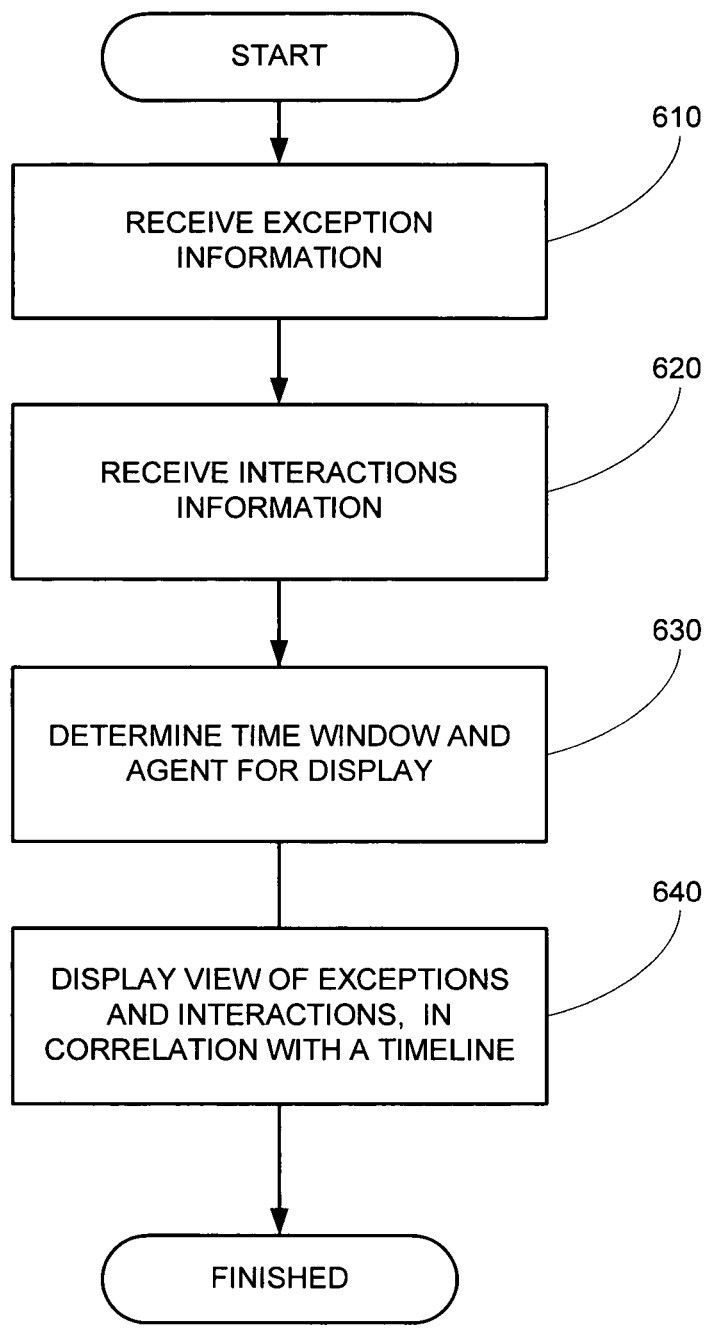
FIG. 6 is a flowchart of a method for simultaneous display of multiple types of call agent data.

FIG. 6 is a flowchart of a method for simultaneous display of multiple types of call agent data. In block 610, information about exceptions to agent adherence is received. The information describes a period of agent activity, indicating an agent identifier and an occurrence time, that does not comply with a scheduled activity for the agent. In block 620, information about available interactions for specific time periods and agents is received. In block 630, the value for a time window and at least one agent is determined. The time window and agent(s) may be solicited from a user, or default values may be used. In block 640, a view of the exceptions for this agent occurring in the time window is displayed, along with available interactions for this agent. In this view, the exceptions and the interactions are displayed in correlation with a timeline.

Figure 7:
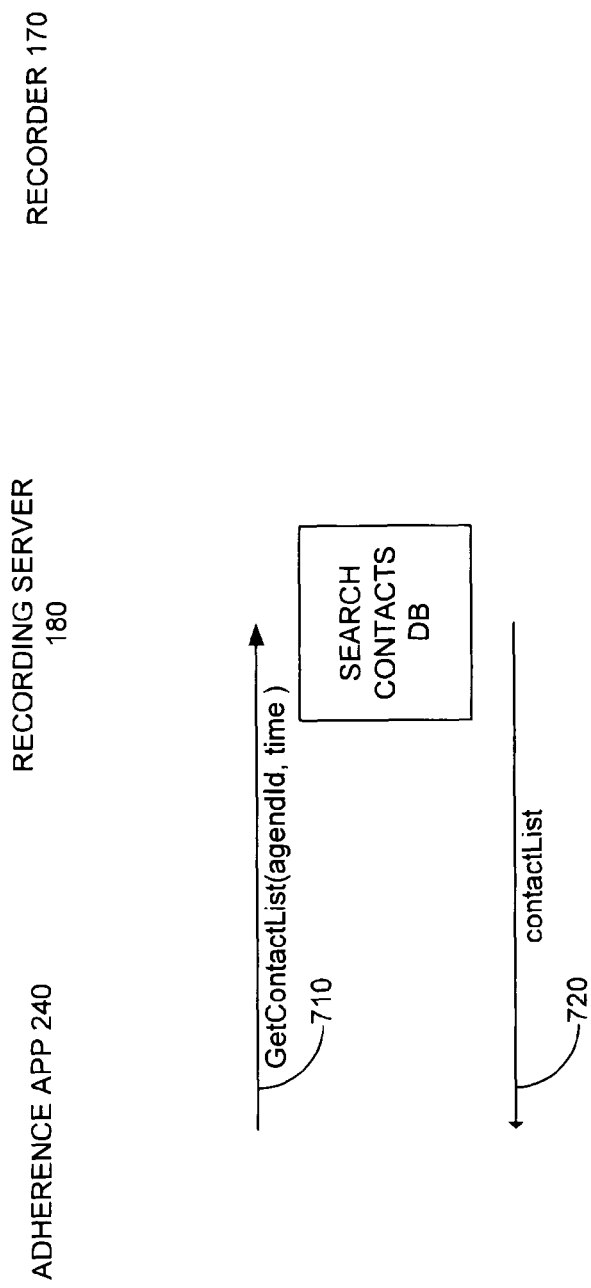
FIG. 7 is a sequence diagram for obtaining a list of agent interactions.
Figure 8:
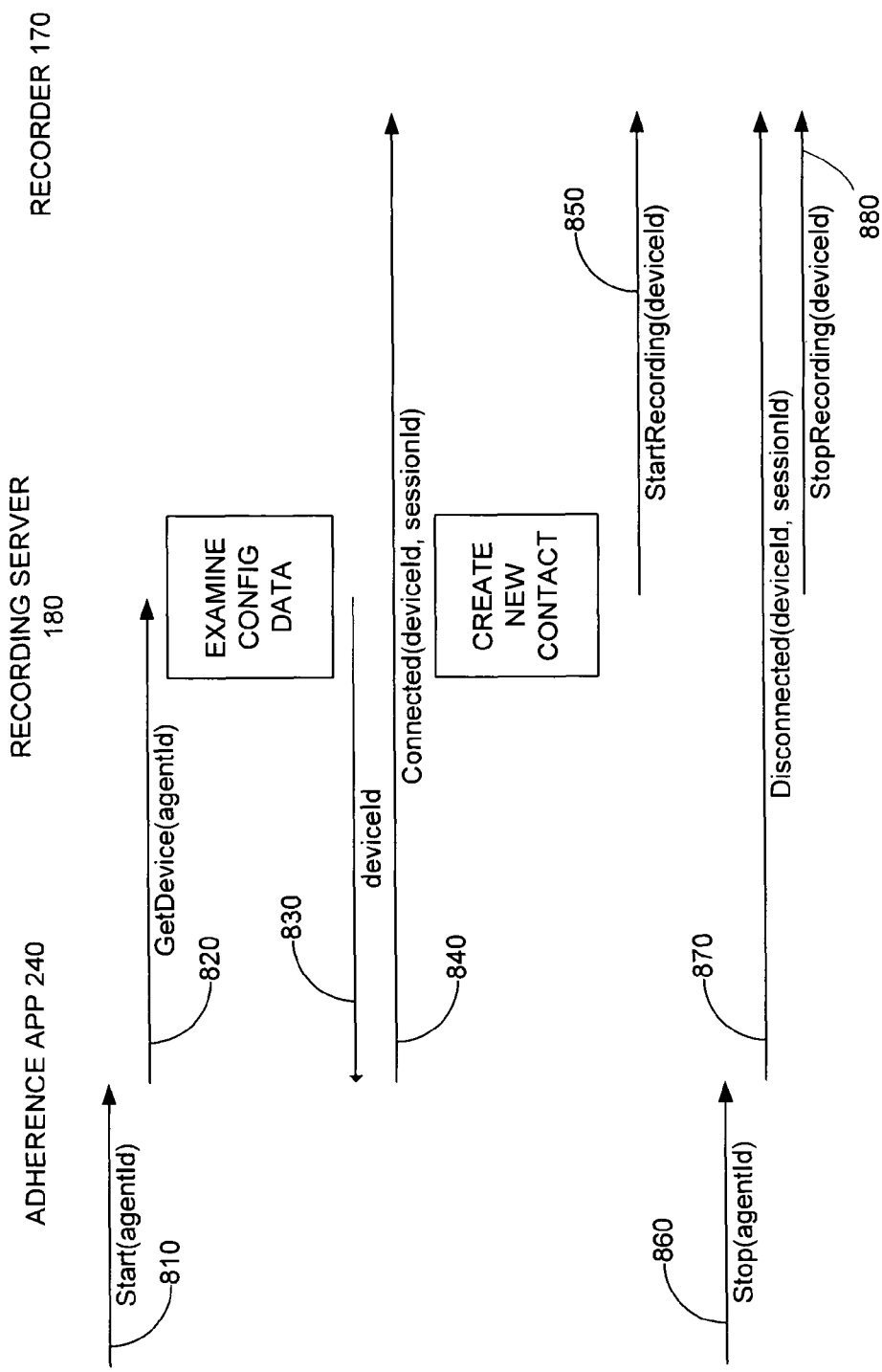
FIG. 8 is a sequence diagram for a record on-demand feature.
Figure 9:
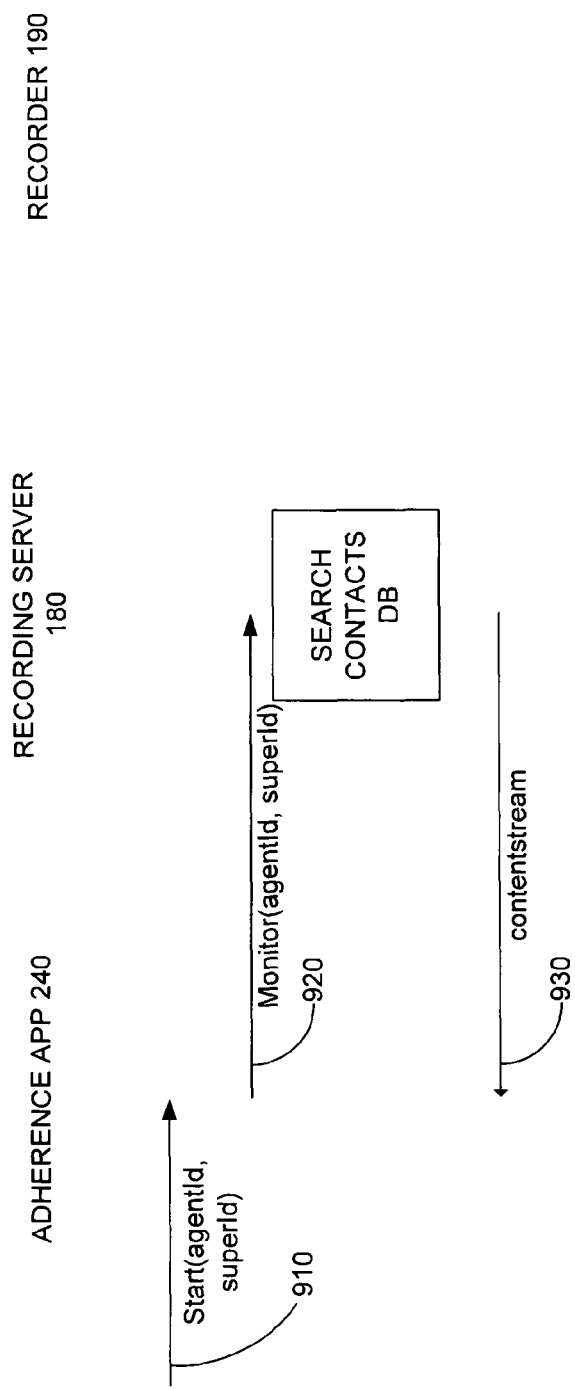
FIG. 9 is a sequence diagram for a live monitor feature.

FIGS. 7-9 are sequence diagrams showing the component interactions involved for the list agent interactions, record on-demand and live monitor features described above. The components involved are the adherence application 240, the recording server 180, and the recorder 170.

FIG. 7 is a sequence diagram for obtaining a list of agent interactions. This list is used, for example, to display the interaction line 370 in FIG. 3. The adherence application 240 calls the GetInteractionList function (710) provided by the recording server 180. The adherence application 240 passes in an agent identifier and a time frame. The recording server 180 searches the interactions database 190 (see FIG. 1) for interactions corresponding to the requested agent and time frame. The recording server 180 then returns to the adherence application 240 with the list (720). In this example, the list contains the interaction Name, Identifier, Start, End, AgentRole (e.g., primary or secondary), and ContentType (e.g., audio, workstation activity, both, none).

FIG. 8 is a sequence diagram for the record on-demand feature. The sequence starts with the adherence application 240 receiving user input (810) indicating the start of recording for a particular agent. The adherence application 240 calls the GetDevice function (820) in the recording server 180, passing in an agent identifier. The recording server 180 examines configuration data to determine the telephone or workstation associated with the requested agent identifier. The recording server 180 then returns 830 the identifier of the associated recorder to the adherence application 240.

Next, the adherence application 240 sends a Connected event (840) to the recording server 180, passing in the recorder identifier obtained earlier, and a unique session identifier. The recording server 180 creates a new interaction in the interactions database 190 (including the start time and agent), and sends the identified recorder 170 a StartRecording command (850).

At some later time, the adherence application 240 receives user input (860) indicating the end of agent recording. The adherence application 240 sends a Disconnected event (870) to the recording server 180, passing in the recorder identifier and the session identifier. The recording server 180 adds the stop time to the interaction in the interactions database 190, and sends the identified recorder 170 a StopRecording command (880).

FIG. 9 is a sequence diagram for the live monitor feature. The sequence starts with the adherence application 240 receiving user input (910) indicating the start of monitoring for a particular agent. The adherence application 240 passes in the agent identifier and the supervisor identifier to the recording server 180, which returns a content stream 920. As explained earlier, the server maintains configuration data which associates recorder(s) with agents. Therefore, the content stream 920 contains a combination of audio, workstation activity, or other media types, depending on the recorder(s) associated with the agent. In one implementation, the recording server 180 provides a web server interface, which allows the adherence application 240 to present the content stream 920 to the user by means of a web browser.

Figure 10:
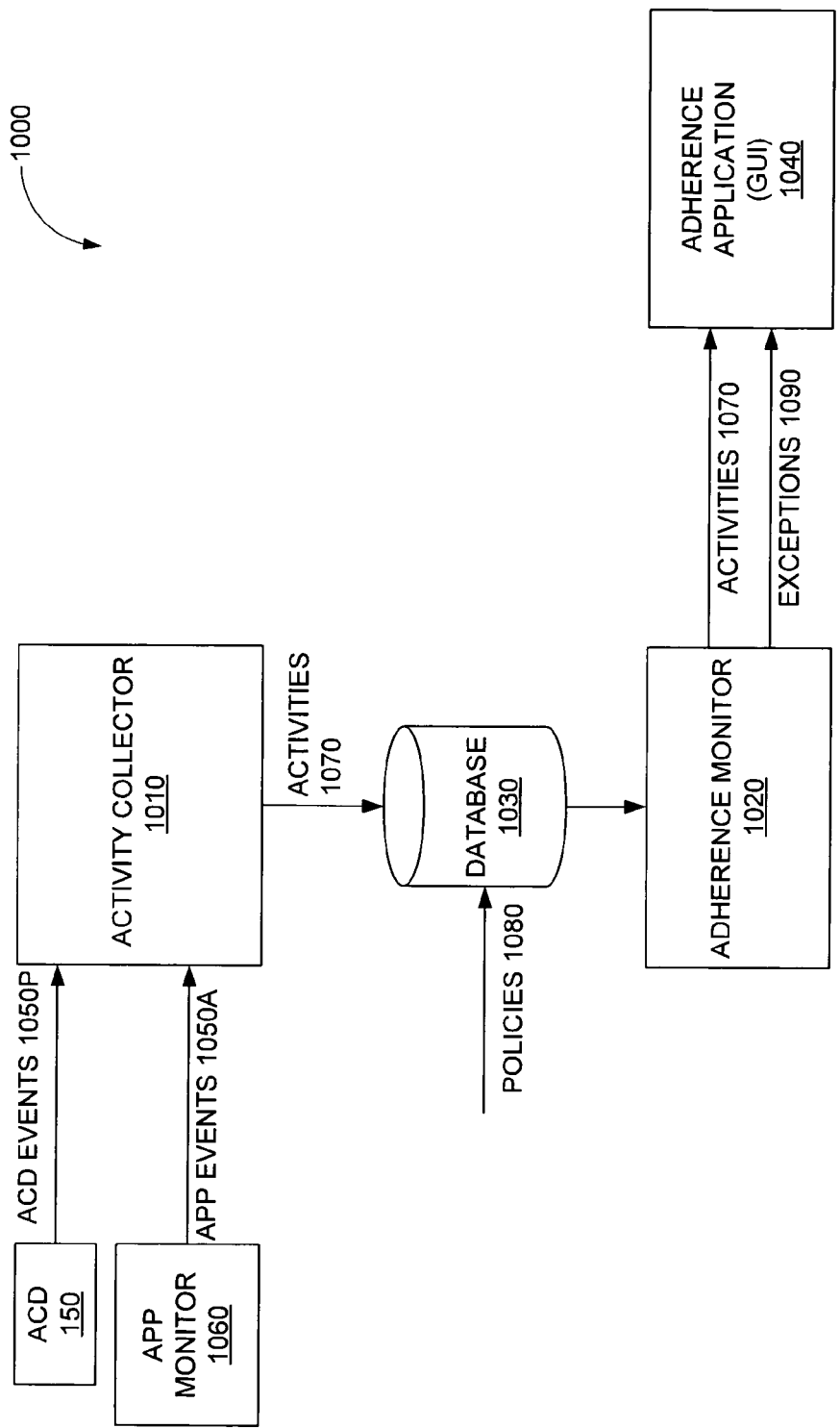
FIG. 10 is a block diagram of an adherence subsystem which takes into account agent activities associated with different devices.

As described earlier, an adherence subsystem may support different levels of adherence. In the embodiment described earlier in connection with FIG. 2, a low-level form of adherence measured whether work tasks actually performed by agents complied with a schedule. FIG. 10 is a block diagram of another adherence subsystem embodiment which supports a higher-level form of adherence.

Adherence subsystem 1000 takes into account agent activities associated with different devices (e.g., agent phone activity and agent workstation activity). This particular adherence subsystem 1000 also compares time spent in these activities to thresholds defined in a policy. Note that although this particular adherence subsystem includes both of these features, the features are independent.

The adherence subsystem 1000 includes an activity collector 1010, an adherence monitor component 1020, an adherence database 1030, and an adherence application 1040. As the agent takes calls throughout a workday, the ACD 150 reports changes in the state of the agent's phone as ACD events 1050P. As an agent interacts with various applications 1100 on his workstation 120, an application monitor 1060 tracks and reports application events 1050A. In one implementation, the granularity of application events 1050A is application-level, so that events describe when applications start and exit, and when a user switches from one application to another. In another implementation, the granularity of application events 1050A is screen-level, so that events describe a particular screen displayed within an application. In yet another implementation, application events 1050A are low-level, including input and/or output associated with each application (e.g., keystrokes, mouse clicks, and screen updates).

The collector 1010 receives events 1050 from multiple sources. An event 1050 has an occurrence time and a descriptor, which includes fields such as event source (e.g., ACD, application monitor), type, and agent identifier. If the event 1050 does not include an agent identifier, the collector 1010 maps the phone or workstation identifier to a corresponding agent identifier, based on information obtained at agent login. Thus, the event 1050 indicates, either directly or indirectly, an agent identifier.

The collector 1010 maps the events 1050 into agent activities 1070. In the adherence subsystem 200 described earlier, many different events mapped to the same activity, because the subsystem viewed agent activities in broad categories: Phone, E-mail, Chat, etc. This adherence subsystem 1000 measures agent activities in more detail, distinguishing between an agent available to take calls, talking to a customer and performing after-call work. Thus, events closely correspond to activities in the mapping used by adherence subsystem 1000:

ACD_Avail=Activity_ACD_Avail
ACD_Busy=Activity_ACD_Talk
ACD_AfterCallWork=Activity_ACD_AfterCallWork
ACD_LoggedOut=Activity_Break
PC_Start_Outlook=Activity_PC_Email
PC_SwitchTo_Helpdesk=Activity_PC_Helpdesk The agent activities 1070 are stored in the adherence database 1030. In one implementation, the activity information stored in the adherence database 1030 includes an agent identifier, an activity source, an activity code, a start time, a stop time, and a duration.

The adherence monitor 1020 determines adherence by comparing the activities 1070 to policies 1080 in the adherence database 1030. A policy 1080 describes one or more targets which an agent is expected to meet. Example policies define expectations for time spent in an ACD state, for time spent in an application, for applications an agent is allowed to use, etc. A manager or supervisor defines policies 1080 through one of the WFM applications (not shown). The policies are stored in the adherence database 1030.

An agent activity which does not comply with (adhere to) a policy is an exception. Examples of exceptions include: exceeded average time on a call; exceeded expected time in the Helpdesk application while on a call; exceeded expected time in the customer account database after a call.

As described earlier, a user can define policies which define expected durations for various agent activities. Defining policies manually can be time-consuming and error-prone. Yet another implementation of an adherence subsystem (not shown) uses historical call center data to create policy templates. The user then creates policies from these templates, which saves time and reduces errors.

This adherence subsystem records agent activities for a period of time (usually several weeks to a month). The subsystem analyzes the recorded data to determine call statistics, such as minimum, maximum, average and standard deviation of various agent activities. These statistics represent typical or normal call center operation. From these statistics, the subsystem creates policy templates which describe expectations for agent activities.

Agents typically handle calls of various types. For example, some calls are related to product A and others related to product B. Since these different types of calls often exhibit different characteristics, the subsystem analysis can be supplemented by user input which identifies certain calls as belonging to a group. In that case, rather than producing call statistics for all calls in the analysis period, the subsystem instead produces per group statistics, and policy templates for each group.

Figure 11:
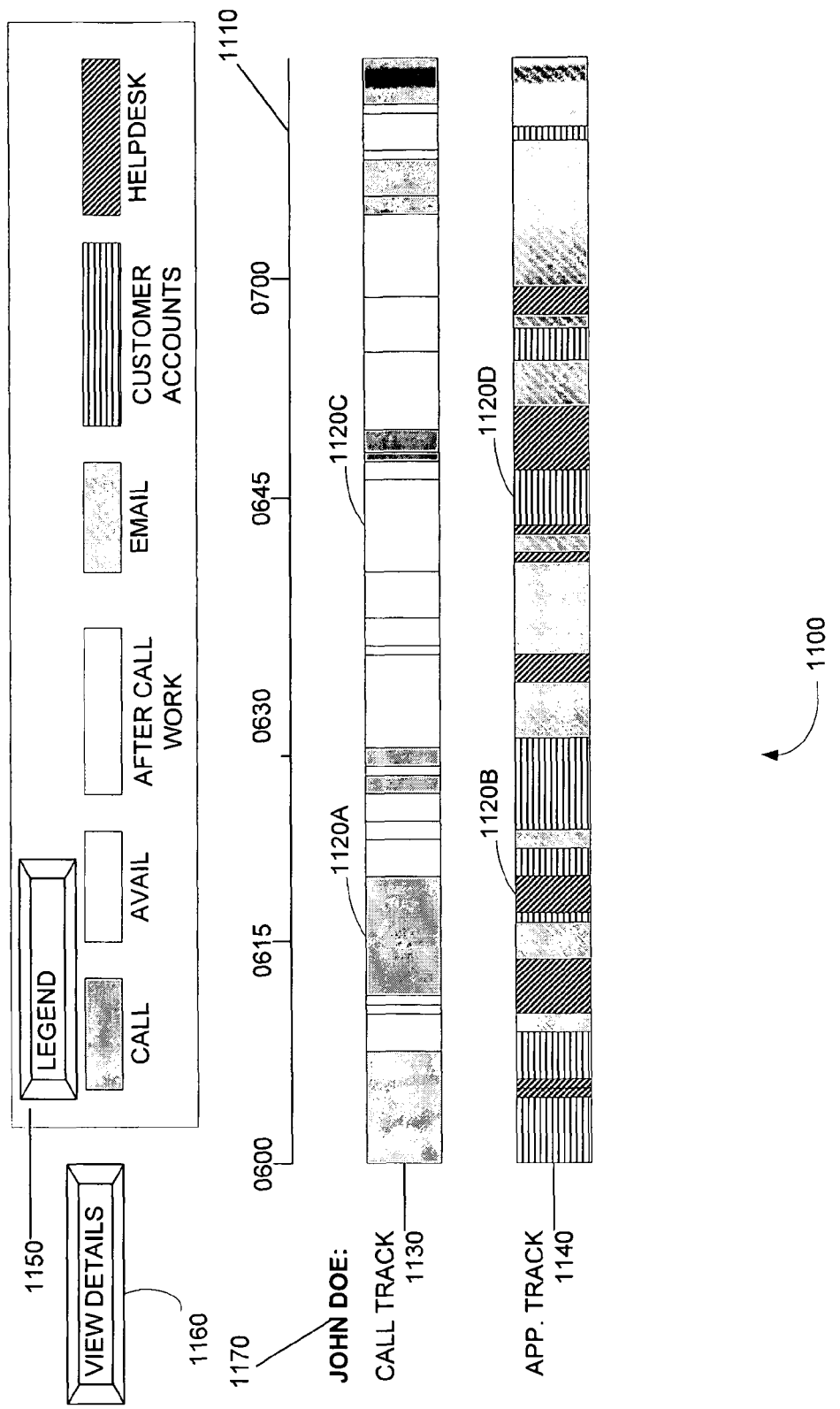
FIG. 11 shows an example of the novel timeline view of FIG. 10.

The adherence application 1040 receives information about these exceptions (1090) and information about activities 1070. The adherence application 1040 uses the information describing activities 1070 from different event sources (e.g., ACD and workstation) to present a novel timeline view of agent activity on a supervisor workstation, where it can be viewed by a call center supervisor. This novel timeline view presents, simultaneously and in the same window, agent activities from different sources, correlated in time. FIG. 11 shows an example of this novel timeline view 1100 as displayed on a supervisor workstation.

A timeline axis 1110 is arranged to display time periods across the screen in one direction. In the timeline view 1100 of FIG. 11, the granularity of the timeline axis 1110 is 15 minutes, starting at 6:00 AM. Blocks 1120 indicate periods of agent activity, occurring at specific times and for specific durations, and the location of an activity block 1120 is aligned with the timeline axis 1110 to show this time and duration. For example, 1120A describes an event lasting from 6:12 to 6:17, and is therefore placed under timeline axis 1110 such that the start of the block 1120A is located to the left of the 6:15 mark, and the end of the block 1120A is located to the right of the 6:15 mark.

In the timeline view 1100, each event source is placed on a different line. Thus, activity blocks for ACD, or call, events (e.g. 1120A) appear on the Call Track line (1130) and activity blocks for application events (e.g. 1120B) appear on the Application Track line (1140). Within the same source, identifying information about an event is conveyed by displaying the block 1120 in a particular color, shade, or pattern.

For example, the timeline view 1100 uses different colors when displaying activity blocks 1120 for activities with different ACD states. As another example, the timeline view 1100 uses different colors when displaying activity blocks 1120 for activities with different workstation applications. In this manner, activity blocks 1120 are visually distinguishable from each other, and the color/shade/pattern conveys important identifying information to the user. In one implementation, a legend 1150 is included to show which color/shade/pattern corresponds to each event identifier. The View Details button (1160), when activated, displays details for a selected activity in a text-based, rather than graphical, format.

The example shown in FIG. 11 has been simplified to show only activities for a single agent (identified by label 1170). Other implementations display activities for multiple agents by stacking the track lines one under the other. Although specific user interface controls are discussed here, other ways of gathering user input are known (e.g., menus, commands, etc.) and are intended to be included in the scope of this disclosure.

In this timeline view 1100, timing relationships between ACD events 1050P and application events 1050A are now visible. Blocks 1120A and 1120B show one such relationship: an agent using a Helpdesk application during a call. Blocks 1120C and 1120D show another relationship: an agent uses a customer account database after a call ("wrap up").

The timeline view 1100, by displaying these timing relationships, allows a call center supervisor to quickly determine whether or not an agent is adhering to call center policies. A few examples of determinations made by a supervisor using this view are: whether an agent is spending too time much during the call in the helpdesk application; and whether an agent is spending too much time after the call in the customer account database. Once discrepancies are identified, the supervisor can address the possible causes (e.g., the agent needs more training on the helpdesk application, or the screens in the customer account application need to be redesigned).

The information presented in this timeline view 1100 also makes visible to the supervisor areas for further investigation. Examples of areas of supervisor investigation that may be prompted by this view are: what an agent did when the caller was placed on hold; what an agent did while in the ACD After Call Work state; what kinds of transactions are associated with long call times; what agents do while in not-ready states (e.g., Admin or Research).

Although this disclosure focuses on two event sources, the ACD and the application monitor, the activity timeline view described herein is also applicable to other types of events that describe agent activities.

Figure 12:
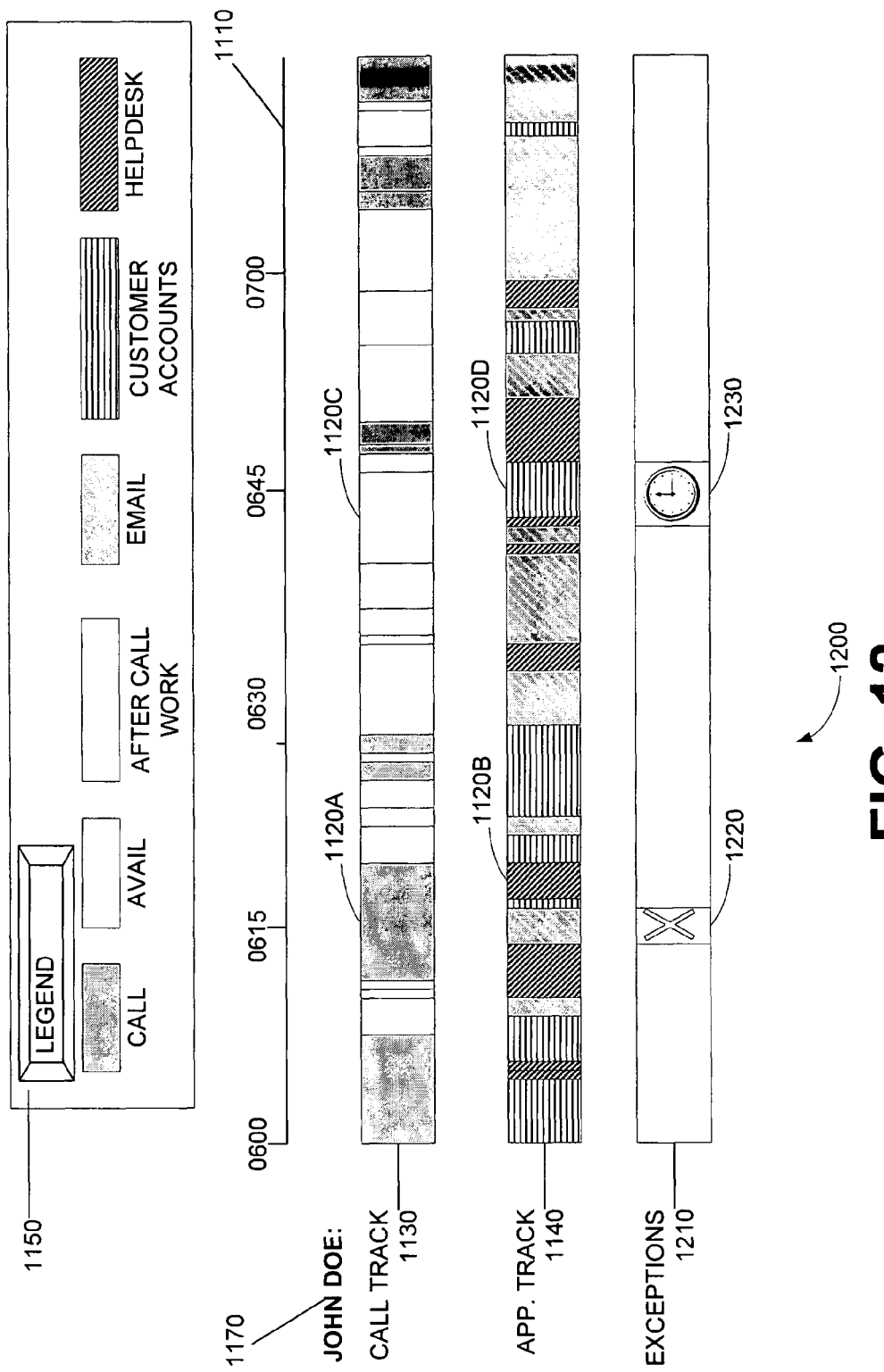
FIG. 12 is another timeline view which explicitly displays exceptions.

As described above, the timeline view 1100 allows a supervisor to visually assess whether or not agents are adhering to call center policies, by examining the timing relationships shown in the view. FIG. 12 is another implementation of a timeline view which explicitly displays instances where agents are not adhering (called "exceptions").

This timeline view (1200) is similar to the implementation in FIG. 11, but includes an additional line that is also correlated with the timeline axis 1110. The Exceptions line 1210 displays exceptions (activities that are out of compliance) using icons. The example shown in FIG. 12 assumes that a policy is defined as follows: the Customer Account and HelpDesk applications are allowed during calls; the Customer Account, HelpDesk and Email applications are allowed during after-call work; and the agent is expected to use the customer account application for less than five minutes during after-call work. The Exceptions line 1210 shows that the agent is adhering to this policy for all activities except for two. One exception occurs in block 1220, when the agent accesses the Email application while on a call. This type of exception, where an agent uses an application that is not allowed, is represented using an X icon. Another exception occurs in block 1230, when the agent spends longer than five minutes in the customer account application during after-call work. This type of exception, where an agent spends longer than allowed in an application, is represented using a clock icon.

Figure 13:
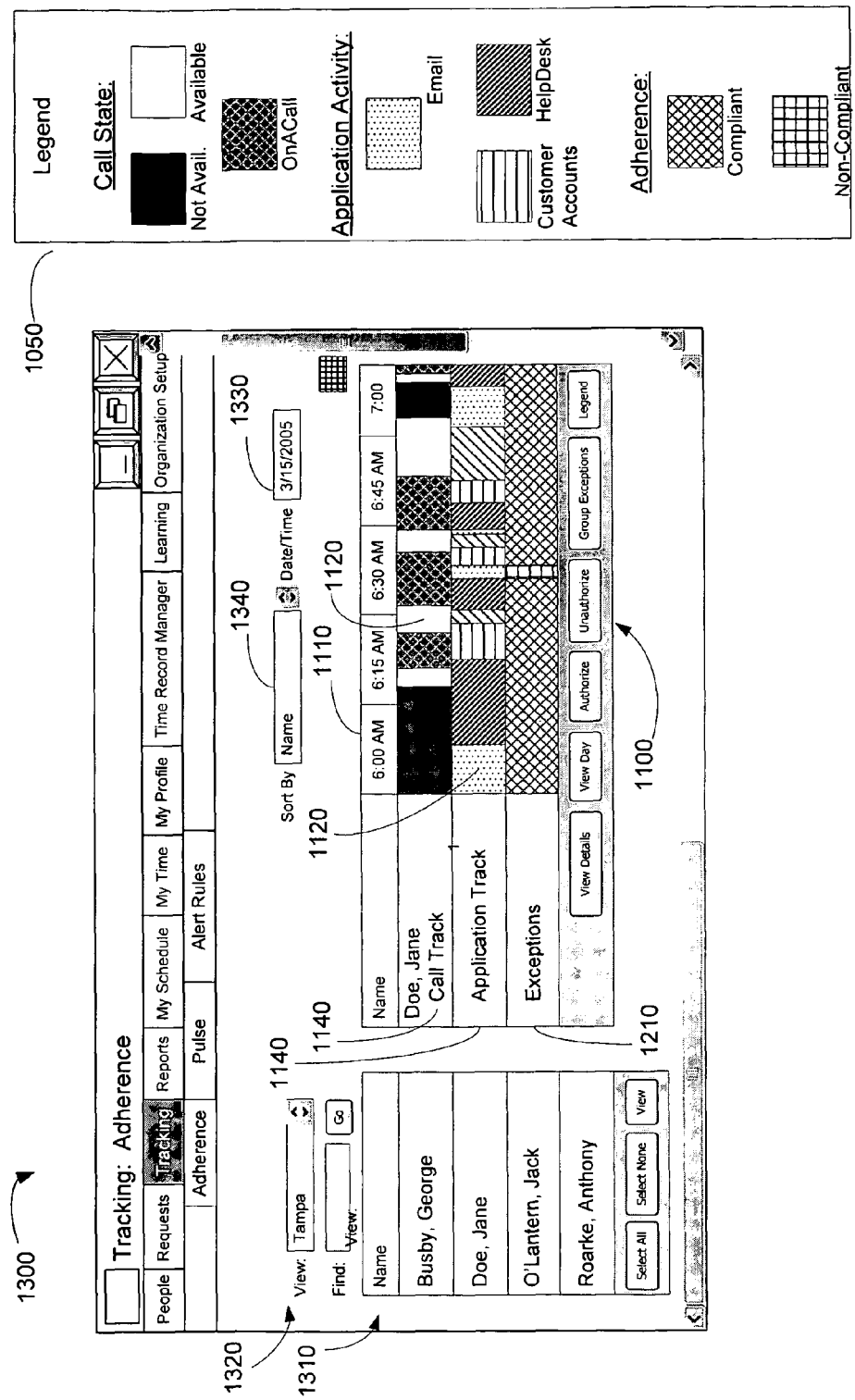
FIG. 13 shows the timeline view of FIG. 12 as displayed in a window and integrated with an additional set of controls.

FIG. 13 shows the timeline view plus exceptions as displayed in a window and integrated with an additional set of controls. A user selects one or more agents through an agent list box control 1310. A user may choose agents from different locations through a location list box control 1320. A user also selects a time period for display through the Time/Date control 1330. The timeline view 1100 is the same as in FIG. 11. The sort criteria list box 1340 allows the timeline view 1100 to be sorted by various criteria such as agent name, location, etc. Although specific user interface controls are discussed here, other ways of gathering user input are known, and are intended to be included in the scope of this disclosure.

Figure 14:
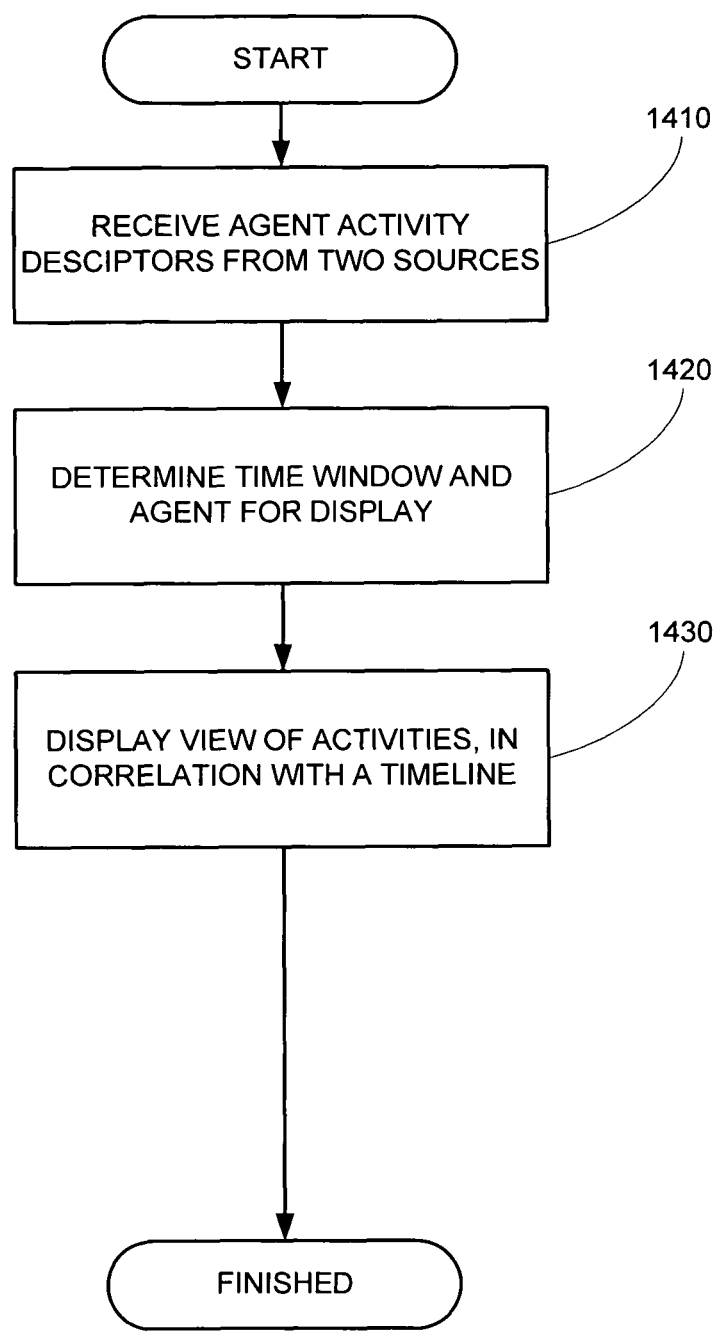
FIG. 14 is a flowchart of a method for simultaneous display of multiple types of call agent data.

FIG. 14 is a flowchart of a method for simultaneous display of multiple types of call agent data. In block 1410, activity descriptors for call center agents are received. The activities originate from at least two sources. Each of the descriptors describes a period of agent activity, indicating an agent identifier and an occurrence time. In block 1420, the value for a time window and at least one agent is determined. The time window and agent(s) may be solicited from a user, or default values may be used. In block 1430, a view of activities that are associated with this agent or agents, and that occur during the time window is displayed. In this view, activities of both types are displayed in correlation with a timeline.

Figure 15:
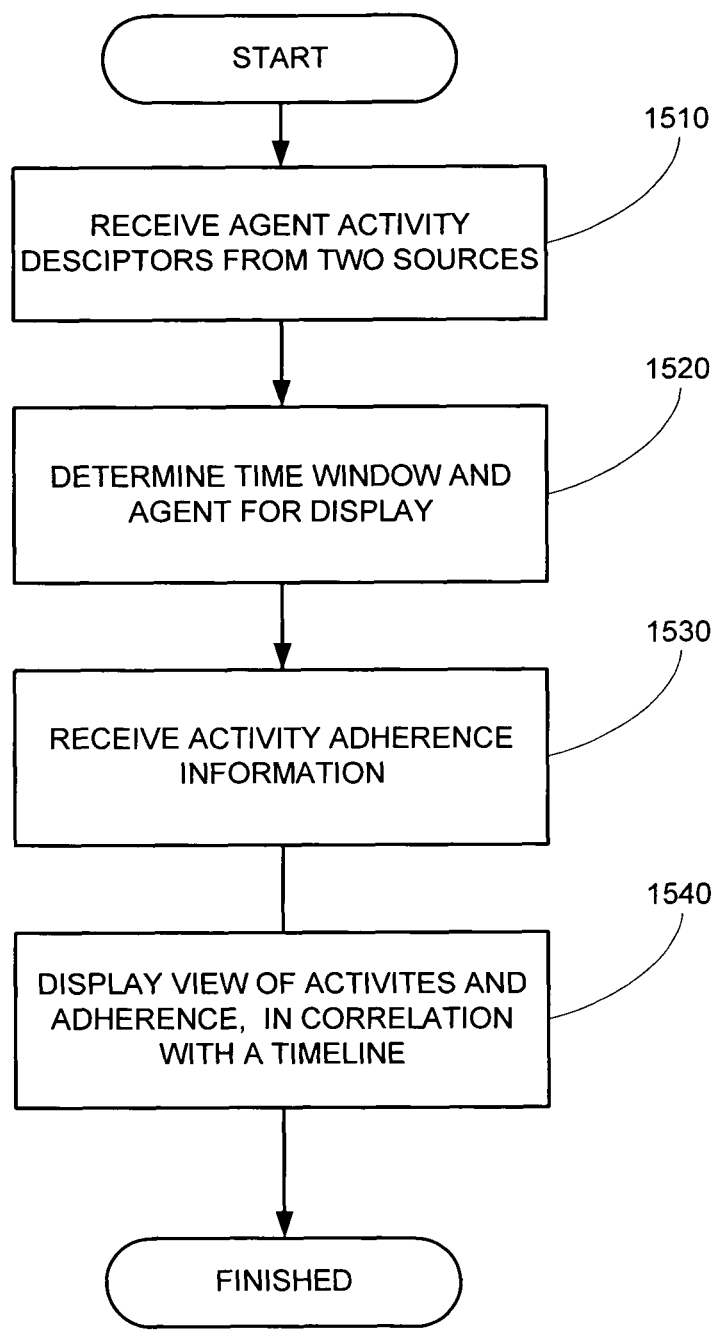
FIG. 15 is a flowchart of a method for simultaneous display of multiple types of call agent data which also includes adherence data.

FIG. 15 is a flowchart of a method for simultaneous display of multiple types of call agent data. In block 1510, activity descriptors for call center agents are received. The activities originate from at least two sources. Each of the descriptors describes a period of agent activity, indicating an agent identifier and an occurrence time. In block 1520, the value for a time window and at least one agent is determined. The time window and agent(s) may be solicited from a user, or default values may be used. In block 1530, information about activities that are exceptions to adherence is received. In block 1540, activities associated with the agents are displayed in the time window, together with exceptions to adherence. In this view, adherence information and activities of both types are displayed in correlation with a timeline.

Figure 16:
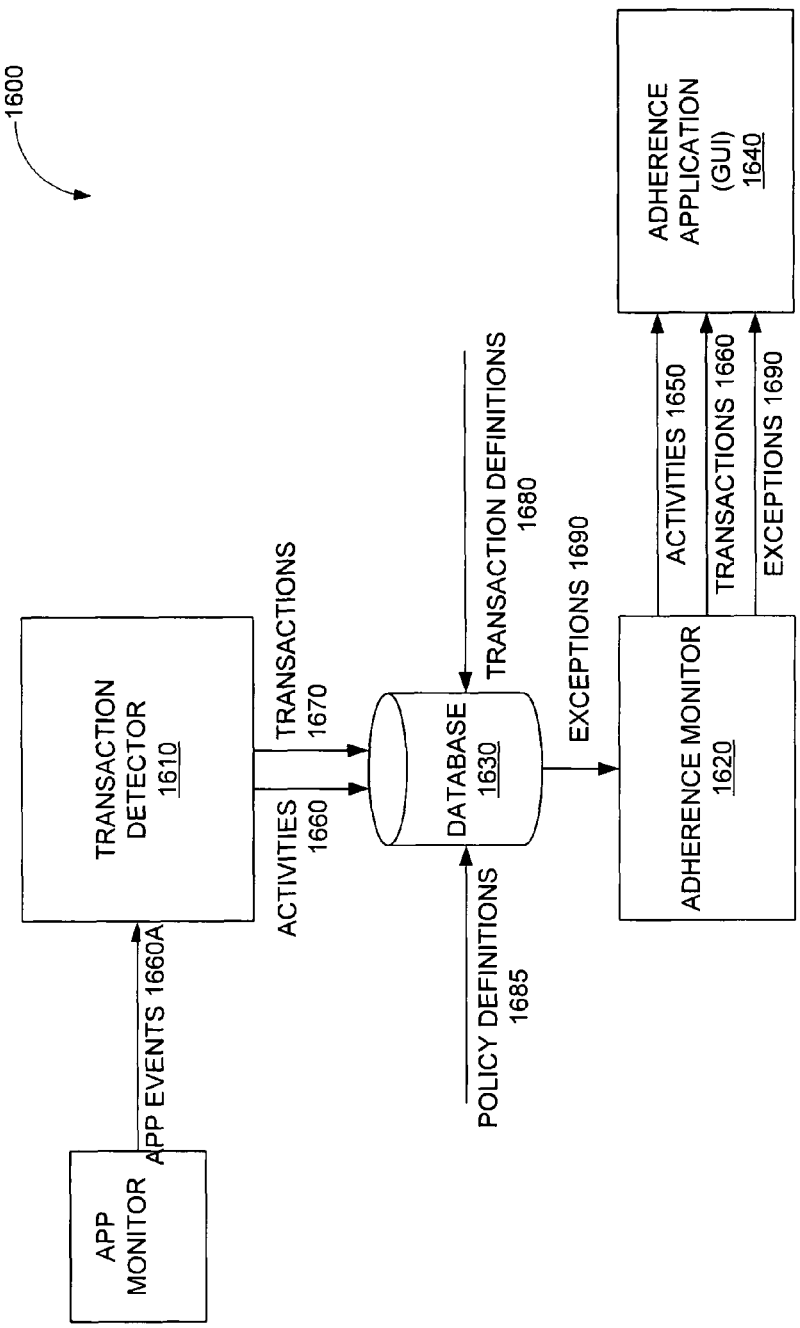
FIG. 16 is a block diagram of another adherence subsystem, in which sequences of agent activities are mapped to business-level transactions, and transactions are compared to a policy.

As described earlier, an adherence subsystem may support different levels of adherence. In the embodiment described earlier in connection with FIG. 2, the adherence monitor compared work tasks actually performed to a schedule. In the embodiment described earlier in connection with FIG. 10, activities were associated with multiple devices, and the adherence monitor compared time spent in activities associated to thresholds in a policy. FIG. 16 is a block diagram of another embodiment which supports an even higher-level form of adherence, in which sequences of agent activities are mapped to business-level transactions, and transactions are compared to a policy.

Adherence subsystem 1600 subsystem includes a transaction detector 1610, an adherence monitor component 1620, an adherence database 1630, and an adherence application 1640. The transaction detector 1610 receives reports of events 1650 from various sources, such as events (1650A) from the application monitor that describe an agent's workstation state. In this example, the application events 1650A are screen-level. That is, an application event 1650A describes a particular screen in a particular application.

In this subsystem, activities 1660 can be derived directly from events: each event 1650 has an occurrence time, and an activity 1660 occurs between two events. Thus, an activity 1660 has a start time, a stop time, and a duration derived from start and stop times.

The transaction detector 1610 examines sequences of events 1650 to find matches to defined transactions. When a match is found, the transaction detector 1610 creates a transaction 1670 from the event sequence and stores the transaction 1670 in the adherence database 1630. Transaction definitions 1680 are business-specific, and are created by manager or supervisor through a WFM application (not shown). Transactions 1670 can best be explained by means of an example, which follows.

A particular call-center campaign involves taking orders from customers. To place a new order, an agent interacts with a "customer entry" screen in the customer relationship manager (CRM) application, followed by a "product entry" screen in the CRM. Other CRM screens may be accessed between the "customer entry" and "product entry" steps, except for the "cancel order" screen. This NewOrder business transaction can then be defined as:

NewOrder=CRM_Cust+[NOT(CRM_Cancel)]+
    CRM_Prod+[NOT(CRM_Cancel)]

In the notation used above, the transaction name appears to the left of the equal sign, and the event sequence appears to the right of the equal sign. In order to match the transaction, events must occur in the order they appear in the definition. Events which are optional appear in brackets. In this example, the combination of bracket and the NOT operator means that any event other than the CRM_Scr_CancelOrder event can occur between the CRM_Scr_CustEntry event and the CRM_Scr_ProdEntry event.

The transactions 1670 detected by the transaction detector 1610 are stored in the adherence database 1630. (In some implementations, the underlying events 1650 and/or activities 1660 are also stored in the adherence database 1630.) The adherence monitor 1020 determines adherence by comparing the transactions 1670 to transaction policies 1685 in the adherence database 1630. Just as the definition of a transaction is specific to a campaign, business, or enterprise, so are the policies applied to that transaction. A transaction policy 1685 is a rule that defines correct or proper execution of a transaction, in terms of event sequences. Many event sequences may map to a particular transaction (according to the transaction definition 1680), but only a subset of those event sequences represent a properly executed transaction (according to the transaction policy 1685).

The following example, building on the previous example of transaction definitions, will illustrate the use of transaction policies 1685. A policy for the NewOrder business transaction (described above) can be defined as:

NewOrder=CRM_Cust+
    [CRM_NewCust|CRM_OldCust+Helpdesk]+
    Inv_Check+CRM_Prod This notation is similar to the one used above. Events must occur in the order listed in the policy definition. Events in brackets are optional. When events are separated by a vertical line, any of the events matches. So this policy says that to properly execute a new order, an agent must go to the CRM_Cust screen, followed by either the CRM_NewCust or the CRM_OldCust screen, followed by the Inv_Check screen, followed by the CRM_Product screen.

The adherence monitor 1020 compares detected transactions 1670 to transaction policies 1685 and generates adherence exceptions 1690 for discrepancies between the two. In the example above, a transaction which includes a CRM screen other than NewCust or OldCust will be detected as a NewOrder transaction, but will also be reported as an exception. As another example, a transaction which does not include the Inv_Check screen will be detected as a NewOrder transaction, but will also be reported as an exception.

The adherence application 1640 receives information about activities 1660, transactions 1670 and (optionally) exceptions 1690. The adherence application 1640 uses the information describing the activities 1660 and the transactions 1670 to present a novel timeline view of agent transactions, against a timeline, on a supervisor workstation.

Figure 17:
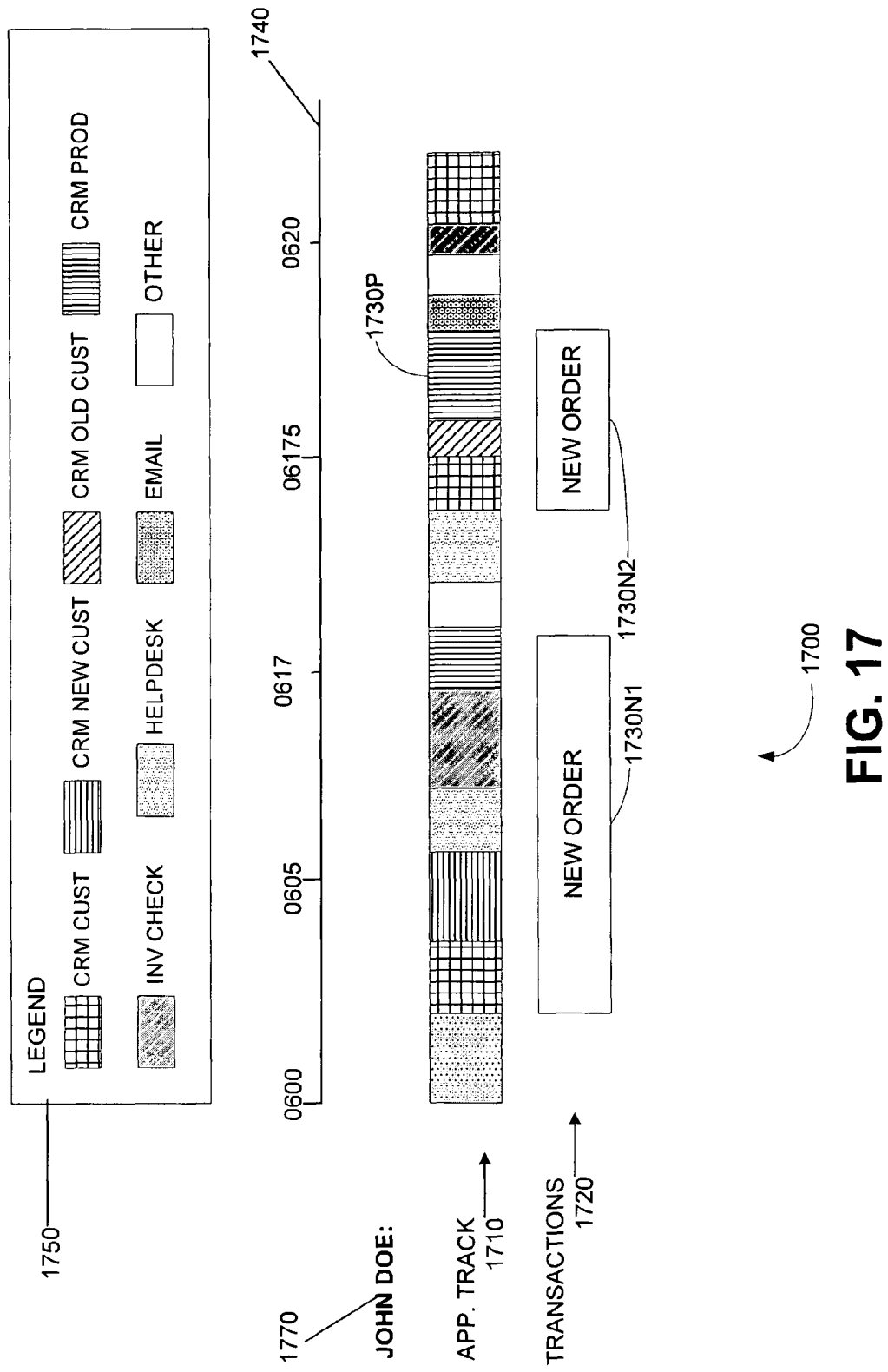
FIG. 17 shows another timeline view including transactions.

FIG. 17 shows an example of this timeline view 1700 as displayed on a supervisor workstation 1120. For each agent, one line (1710) shows the agent's workstation activities (1660), and line (1720) shows the business transactions (1670) corresponding to the workstation activities. Each activity or transaction is represented by a block 1730. Each activity or transaction has an occurrence time and a duration, and the location of each block 1730 is aligned with a timeline axis 1740 to show this time and duration.

Different colors (or patterns, or shadings) are used to display blocks 1730 representing different workstation activities. In this manner, activities are visually distinguishable from each other, and the color/shade/pattern conveys important identifying information to the user. Blocks 1730 representing detected transactions are identified by a label within the block. This example assumes the transaction definitions described above. Therefore, the Transactions line 1720 beneath Activities line 1710 displays two detected NewOrder transactions (1730N1 and 1730N2)

A conventional adherence subsystem presents the call center supervisor with a timeline view of agent activity throughout the workday. This allows the supervisor to see when an agent is adhering to call center policies, such as adherence to schedule, adherence to time limits spent on specific activities, and adherence to usage of specific applications. However, the underlying purpose of agent activities is to perform business transactions, and the conventional adherence subsystem does not provide any information about adherence to transaction processing policies.

This novel timeline view 1700 allows a supervisor to see call center operations in terms of high-level business transactions rather than low-level agent activities. A view focused on business transactions allows the supervisor to detect situations that might otherwise be missed. For example, an agent may complete an order without checking inventory, which is an exception to call center business policy. But a supervisor would not detect that in a conventional adherence system, because the agent is adhering to schedule (taking calls) and is using the right app (CRM) while on the call. In contrast, the novel timeline view gives the supervisor insight into transactions, which allows the supervisor to detect the problem.

Figure 18:
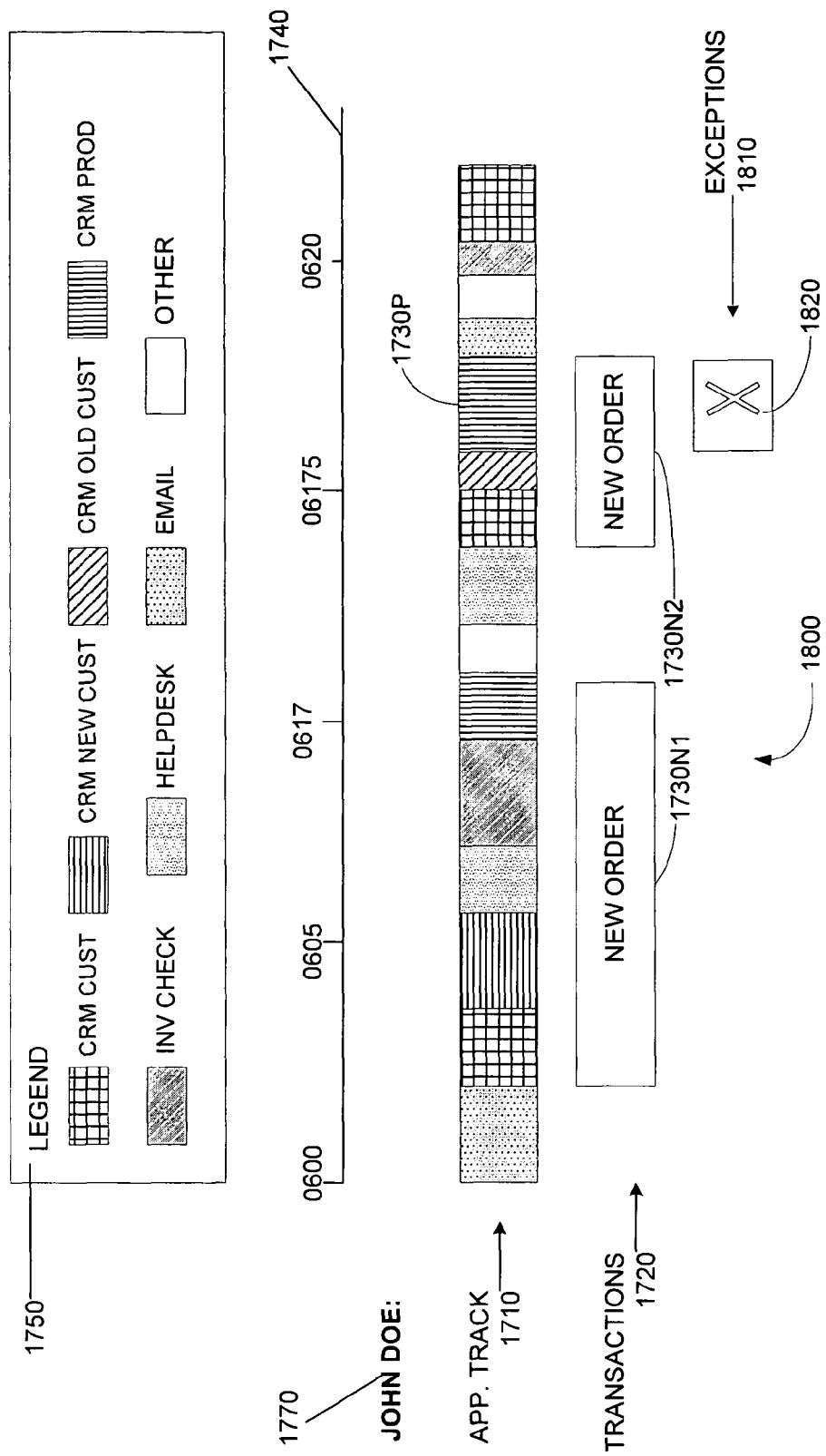
FIG. 18 shows another timeline view of transactions which also displays exceptions.

FIG. 18 is timeline view of transactions which also displays exceptions. Timeline view 1800 is similar to the implementation in FIG. 17, but includes an additional line that is also correlated with the timeline axis 195. The Exceptions line 1810 displays exceptions—transactions that are out of compliance—with an icon. Other implementations could use a different color/shade/pattern rather than an icon.

The example shown in FIG. 17 assumes the transaction and policy definitions described above. The Transactions line 1720 shows that two NewOrder transactions have been detected (1730N1 and 1730N2). Furthermore, the Exceptions line 1810 shows that an exception occurred during the second transaction (1730N2). An "X" icon (1820) beneath the CRM_Prod workstation activity (1730P) indicates an exception at this point in the transaction, since the Inv_Check screen activity did not appear before the CRM_Prod activity.

Figure 19:
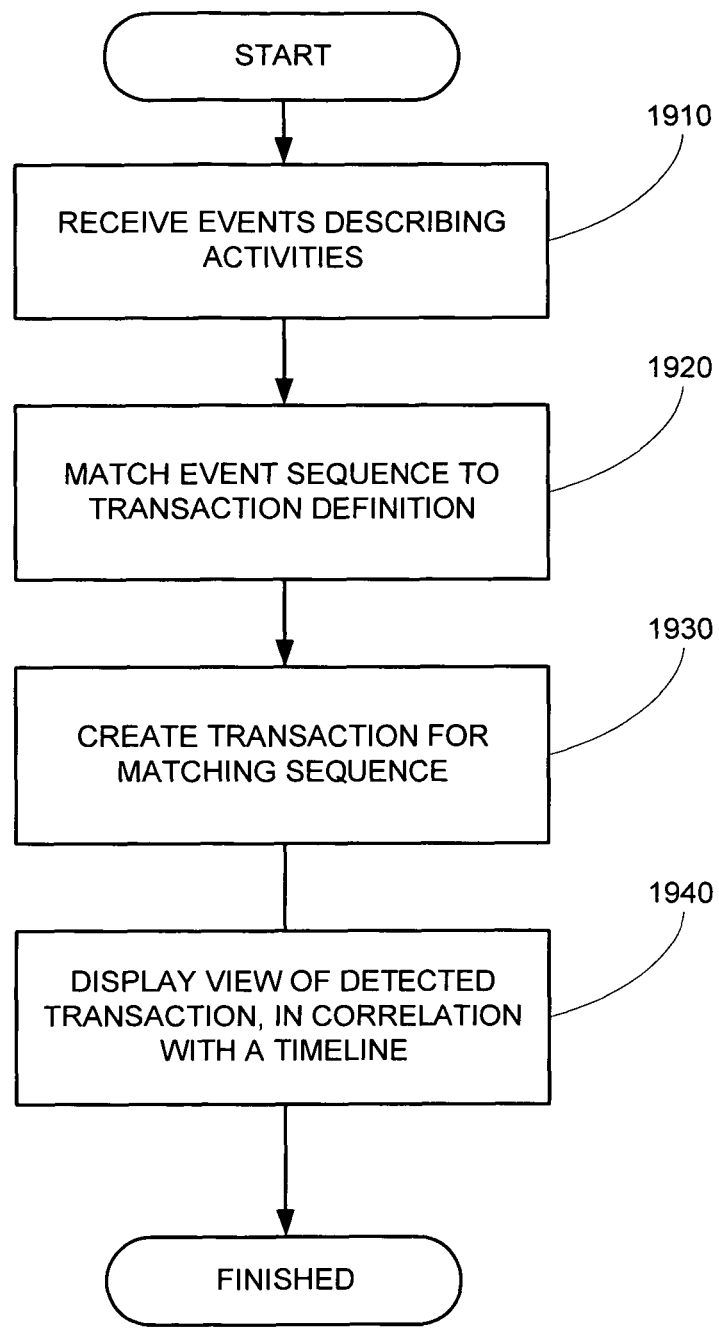
FIG. 19 is a flowchart of a method for detecting business level transactions from events generated by call center components.

FIG. 19 is a flowchart of a method for detecting business level transactions from events generated by call center components. In block 1910, events are received from call center components. Each of the events describes an agent activity, including an agent identifier and an occurrence time. In block 1920, a received event sequence to transaction definitions stored in the adherence database 1630 is matched. In block 1930, a transaction from the matching sequence is created. In block 1940, the detected transaction is displayed in a call center workforce management system.

Figure 20:
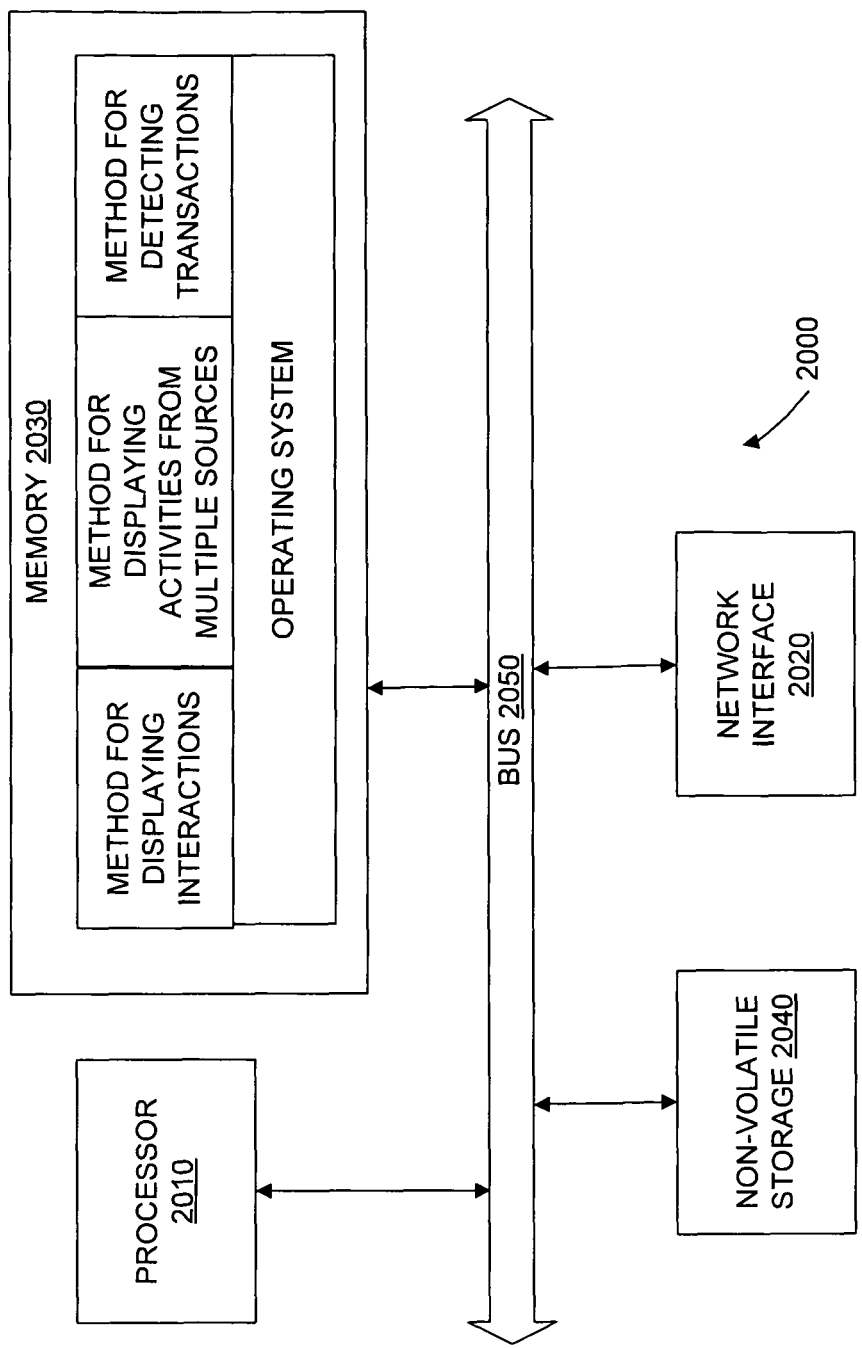
FIG. 20 is a hardware block diagram of a general purpose computer which can be used to implement any of the methods disclosed herein.

FIG. 20 is a hardware block diagram of a general purpose computer 2000 which can be used to implement any of the functionality disclosed herein. The system 2000 contains many components that are well-known in the art of call center software, including a processor 2010, a network interface 2020, memory 2030, and non-volatile storage 2040. Examples of non-volatile storage include, for example, a hard disk, flash RAM, flash ROM, EEPROM, etc. These components are coupled via bus 2050. Memory 2030 contains instructions which, when executed by the processor 2010, implement the methods disclosed herein.

Omitted from FIG. 20 are many conventional components, known to those skilled in the art, which are not necessary to explain the operation of the system 2000. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variations are within the scope of the disclosure as determined by the appended claims when interpreted in accordance with the breadth to which they are fairly and legally entitled.

We claim:

1. A method for displaying multiple activities associated with one of a plurality of call center agents correlated in time, the method comprising the steps of:

receiving a first plurality of events describing a call center agent activity of a first type, each of the first plurality of events indicating an occurrence time; wherein the receiving the first plurality of events further comprises the steps of: receiving call activities originating from a first source, each call activity comprising an occurrence time;

receiving a second plurality of events describing a call center agent activity of a second type, each of the second plurality of events indicating an occurrence time; wherein the receiving the second plurality of events further comprises of: receiving application activities originating from a workstation associated with the at least one of the call center agents, each application activity comprising an occurrence time;

determining at least one of the call center agents to be displayed;

graphically displaying activity information in visual correlation with a timeline, the activity information including the call activities originating from the first source, the application activities originating from the workstation associated with the at least one of the call center agents, and scheduled activities, each of the activities associated with the at least one call center agent, the visual correlation of the activity information from the first source and the application activities originating from the workstation being displayed along respective co-displayed timelines;

wherein the graphically displaying step further comprises: displaying a timeline axis comprising a plurality of time periods; displaying each of the first plurality of events on a first line along the timeline axis such that the occurrence time for each of the first plurality of events is visually correlated with the corresponding time period of the timeline axis; and displaying each of the application activities originating from the workstation on a second line along the timeline axis such that the occurrence time for each of the second plurality of events is visually correlated with the corresponding time period of the timeline axis; and matching a sequence of the events within the activity information with one of a plurality of transaction definitions; and displaying a transaction described by the matching sequence.

2. The method of claim 1, further comprising the steps of: determining whether at least one of the call or application activities complies with a predefined policy; and displaying an exception if the at least one of the call or application activities does not comply with the predefined policy.

3. The method of claim 1, wherein the call activities are Computer Telephony Integration-triggered events, and the application activities are workstation-triggered events.

4. The method of claim 1, further comprising the steps of: displaying, in visual correlation with the timeline, each of a plurality of agent interactions.

5. A non-transitory computer-readable medium having a computer executable program for displaying multiple activities associated with one of a plurality of call center agents correlated in time, the program comprising the steps of:
receiving a first plurality of events describing a call center agent activity of a first type, each of the first plurality of events indicating an occurrence time; wherein the receiving the first plurality of events further comprises the steps of: receiving call activities originating from a first source, each call activity comprising an occurrence time;
receiving a second plurality of events describing a call center agent activity of a second type, each of the second plurality of events indicating an occurrence time; wherein the receiving the second plurality of events further comprises of: receiving application activities originating from a workstation associated with the at least one of the call center agents, each application activity comprising an occurrence time;
determining at least one of the call center agents to be displayed;
graphically displaying activity information in visual correlation with a timeline, the activity information including the call activities originating from the first source, the application activities originating from the workstation associated with the at least one of the call center agents, and scheduled activities, each of the activities associated with the at least one call center agent, the visual correlation of the activity information from the first source and the application activities originating from the workstation being displayed along respective co-displayed timelines;
wherein the graphically displaying step further comprises: displaying a timeline axis comprising a plurality of time periods; displaying each of the first plurality of events on a first line along the timeline axis such that the occurrence time for each of the first plurality of events is visually correlated with the corresponding time period of the timeline axis; and displaying each of the application activities originating from the workstation on a second line along the timeline axis such that the occurrence time for each of the second plurality of events is visually correlated with the corresponding time period of the timeline axis; and
matching a sequence of the events within the activity information with one of a plurality of transaction definitions; and displaying a transaction described by the matching sequence.

6. The non-transitory computer-readable medium of claim 5, the program further comprising the steps of: determining whether at least one of the call or application activities complies with a predefined policy; and displaying an exception if the at least one of the call or application activities does not comply with the predefined policy.

7. The non-transitory computer-readable medium of claim 5, wherein the call activities are Computer Telephony Integration-triggered events, and the application activities are workstation-triggered events.

* * * * *